US008887300B1

(12) United States Patent
Gates et al.

(10) Patent No.: US 8,887,300 B1
(45) Date of Patent: Nov. 11, 2014

(54) AUTOMATED MESSAGE TRANSMISSION PREVENTION BASED ON A PHYSICAL REACTION

(71) Applicant: CA, Inc., Islandia, NY (US)

(72) Inventors: Carrie E. Gates, New York, NY (US); Gabriel M. Silberman, Hastings-on-Hudson, NY (US); Maria C. Velez-Rojas, San Jose, CA (US); Serguei Mankovskii, San Ramon, CA (US); Steven L. Greenspan, Dallas, TX (US)

(73) Assignee: CA, Inc., New York, NY (US)

(*) Notice: Subject to any disclaimer, the term of this patent is extended or adjusted under 35 U.S.C. 154(b) by 90 days.

(21) Appl. No.: 13/829,497

(22) Filed: Mar. 14, 2013

(51) Int. Cl.
*H04L 29/06* (2006.01)
*H04L 9/32* (2006.01)
*G06F 21/32* (2013.01)
*H04L 9/08* (2006.01)

(52) U.S. Cl.
CPC .............. *H04F 63/10* (2013.01); *H04L 9/3231* (2013.01); *G06F 21/32* (2013.01); *H04L 9/0866* (2013.01)
USPC .................... 726/27; 726/26; 726/28; 726/29; 726/30; 713/168; 713/169; 713/170; 713/171

(58) Field of Classification Search
CPC ...... H04L 9/3231; H04L 9/0866; G06F 21/32
USPC .......................................................... 726/27
See application file for complete search history.

(56) References Cited

U.S. PATENT DOCUMENTS

| 8,136,944 | B2 | 3/2012 | De Lemos |
| 8,219,438 | B1 | 7/2012 | Moon |
| 8,235,725 | B1 | 8/2012 | Hill |
| 8,755,837 | B2 * | 6/2014 | Rhoads et al. ............. 455/556.1 |
| 2007/0066916 | A1 | 3/2007 | Lemos |
| 2008/0260212 | A1 | 10/2008 | Moskal |
| 2008/0261636 | A1 | 10/2008 | Lau |
| 2009/0281990 | A1 | 11/2009 | Greenspan |
| 2011/0307408 | A1 | 12/2011 | Gates |
| 2012/0143693 | A1 | 6/2012 | Chung |
| 2012/0291106 | A1 | 11/2012 | Sasaki |

OTHER PUBLICATIONS

M. Bishop, D. Frincke, C. Gates and F. Greitzer (2009) AZALIA: and A to Z Assesment of the Likelihood of Insider Attack. In Proceedings of the 2009 IEEE International Conference on Technologies for Homeland Security. Waltham, MA. May 11-12, 2009.

(Continued)

*Primary Examiner* — Longbit Chai
(74) *Attorney, Agent, or Firm* — Vierra Magen Marcus LLP

(57) ABSTRACT

Methods for preventing the transmission of sensitive information to locations outside of a secure network by a person who has legitimate access to the sensitive information are described. In some embodiments, in order for an end user of a computing device to establish a secure connection with a secure network and access data stored on the secure network, a client application running on the computing device may be required by the secure network. The client application may monitor visual cues (e.g., facial expressions and gestures) associated with the end user, detect suspicious activity performed by the end user based on the visual cues, and in response to detecting suspicious activity may perform mitigating actions to prevent the transmission of sensitive information such as alerting human resources personnel or requiring authorization prior to sending information to locations outside of the secure network.

20 Claims, 20 Drawing Sheets

(56) References Cited

OTHER PUBLICATIONS

U.S. Appl. No. 13/829,342, filed Mar. 14, 2013.
U.S. Appl. No. 13/829,384, filed Mar. 14, 2013.
U.S. Appl. No. 13/829,454, filed Mar. 14, 2013.
U.S. Appl. No. 13/829,982, filed Mar. 14, 2013.
U.S. Appl. No. 13/829,523, filed Mar. 14, 2013.
U.S. Appl. No. 13/829,550, filed Mar. 14, 2013.
Office Action dated Aug. 27, 2014, U.S. Appl. No. 13/829,384.
Office Action dated Sep. 15, 2014, U.S. Appl. No. 13/829,454.
Notice of Allowance dated Jul. 14, 2014, U.S. Appl. No. 13/829,523.

* cited by examiner

Mobile Device 140

AUTOMATED MESSAGE TRANSMISSION PREVENTION BASED ON A PHYSICAL REACTION

BACKGROUND

This disclosure relates to systems and methods for preventing the transmission of sensitive or misleading information to locations outside of a secure network.

Humans communicate using both verbal and non-verbal communication. Non-verbal communication may include hand gestures and facial expressions. Both a person's speech (including the words spoken and the tone used when speaking the words) and their facial expressions may be captured and analyzed to detect the person's emotions or mood. Emotions may refer to feelings experienced by a person over a short period of time in response to a particular event (e.g., anger due to reading a particular email). A person's emotions may include anger, fear, sadness, happiness, neutral, and surprise. Moods may refer to a general emotional state that is experienced by a person over a relatively longer period of time than an event triggered emotion.

Facial expressions may provide cues to emotions or moods experienced by a person during a real-time conversation (e.g., during a video conferencing session) or while the person is reading or composing an email message or other form of written communication. Facial expression recognition systems may be used to identify a person or characteristics of the person (e.g., the age and gender of the person), recognize facial expressions performed by the person over time (e.g., by matching selected facial features or expressions with images stored in a facial expressions database), and determine (or infer) an emotional state of the person based on the facial expressions performed by the person over time. A facial expression recognition system may detect expressions associated with facial features (e.g., eyes, eyebrows, nose, or mouth) and changes in facial feature expressions (e.g., changes in the geometric relationships between the eyes and eyebrows or nose and mouth) using machine-learning based techniques. As movement of facial muscles that lead to particular facial expressions may be involuntarily or unintentionally performed by a person in a particular emotional state, the particular facial expressions may be a reliable indicator of the person's particular emotional state.

BRIEF SUMMARY

According to one aspect of the present disclosure, technology for preventing the transmission of sensitive or misleading information to locations outside of a network is disclosed.

One embodiment comprises a method comprising detecting that an end user of a computing device intends to transmit an electronic file to a second person, capturing images of the end user in response to detecting that the end user intends to transmit the electronic file, determining a data transmission delay, delaying a transmission of the electronic file to the second person by the data transmission delay in response to detecting that the end user intends to transmit the electronic file to the second person, determining whether the end user had a negative reaction based on the captured images, and transmitting the electronic file to the second person subsequent to the determining whether the end user had a negative reaction.

One embodiment comprises a system comprising a storage device and a processor in communication with the storage device. The storage device comprises a buffer. The processor detects that an end user of the system intends to transmit an electronic file to an address associated with a second person, acquires images of the end user in response to detecting that the end user intends to transmit the electronic file, determines a data transmission delay, delays a transmission of the electronic file to the address associated with the second person by the data transmission delay in response to detecting that the end user intends to transmit the electronic file, causes the electronic file to be stored in the buffer, determines whether the end user had a negative reaction based on the images, and causes the electronic file to be transmitted to the address associated with the second person subsequent to the determining whether the end user had a negative reaction.

One embodiment comprises a computer program product comprising a computer readable storage medium having computer readable program code embodied therewith. The computer readable program code configured to detect that an end user of a computing device intends to transmit an electronic file to an address associated with a second person, acquire images of the end user in response to detecting that the end user intends to transmit the electronic file, determine a data transmission delay, delay a transmission of the electronic file to the address associated with the second person by the data transmission delay in response to detecting that the end user intends to transmit the electronic file, determine whether the end user had a negative reaction based on the images, and cause the transmission of the electronic file to the address associated with the second person subsequent to determining whether the end user had the negative reaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
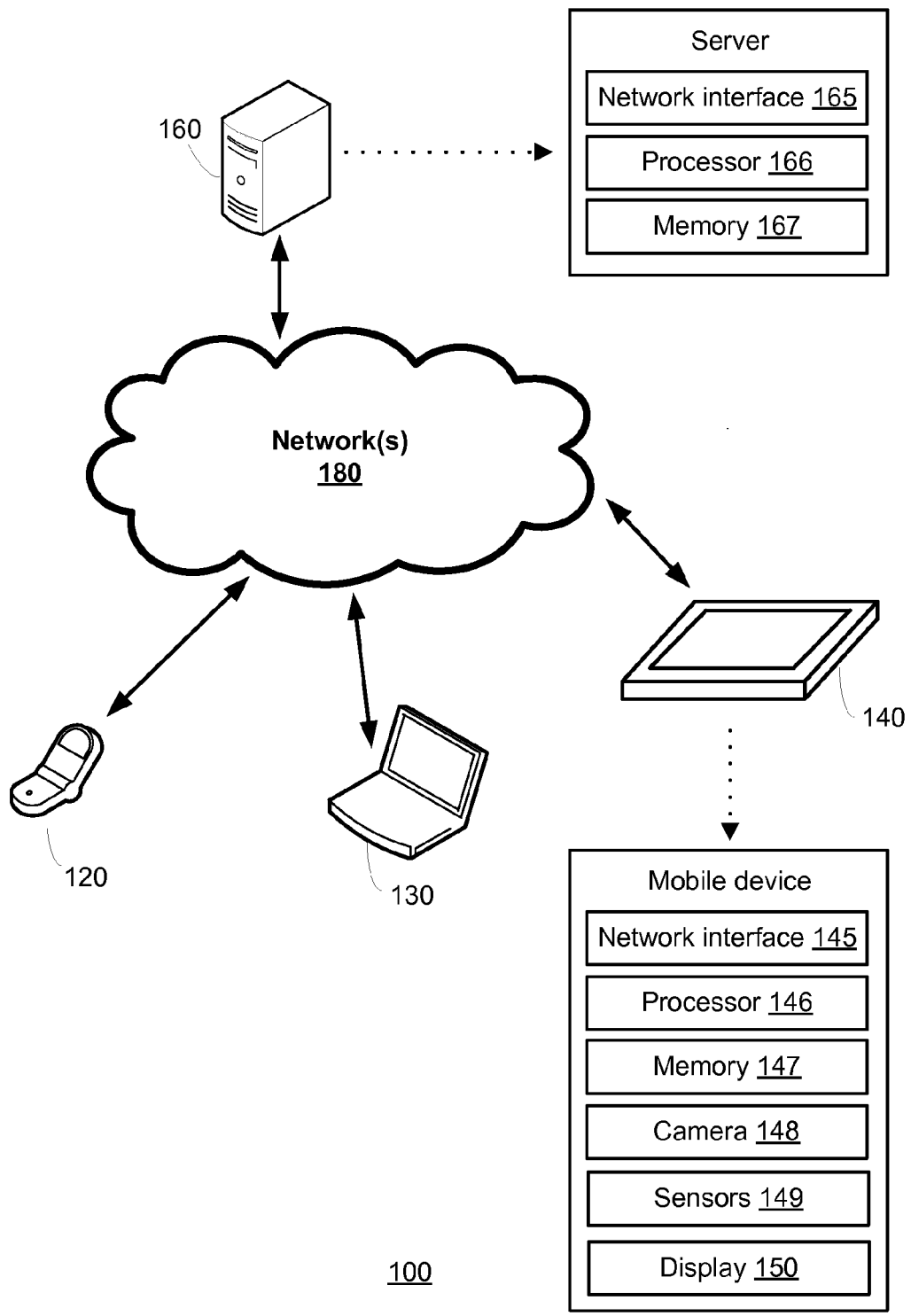
FIG. 1 depicts one embodiment of a networked computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for preventing the transmission of sensitive information (e.g., confidential information or other information that has significant value to an organization) to sources located outside of a secure network by a person who has legitimate access to the sensitive information. In some embodiments, in order for an end user of a computing device (e.g., a mobile device such as a mobile phone or tablet computing device) to establish a secure connection with a secure network and access data stored on the secure network, a client application running on the computing device may be required by the secure network. The client application may monitor visual cues (e.g., facial expressions and hand gestures) associated with the end user, detect suspicious activity performed by the end user based on the visual cues, and in response to detecting suspicious activity may perform mitigating actions to prevent the transmission of sensitive information. In some cases, the mitigating action may comprise alerting human resources personnel and/or requiring authorization prior to sending information to locations outside of the secure network (e.g., the transmission of an email originating from the end user's account to an email address that is outside of the secure network). The mitigating action taken may depend on a business value rating associated with a document (or information contained within the document) that has been requested by the end user to be transmitted.

In some embodiments, the sensitive information may comprise keywords or phrases associated with confidential or secret information. The sensitive information may be embedded within various document sources such as email messages, instant messages, invention disclosure documents, draft versions of financial statements being developed for public release, and new product development documents. In some embodiments, the determination of whether a document includes sensitive information may be based on a business value rating associated with the document. More information about methods for assigning a business value rating to a document can be found in U.S. patent application Ser. No. 12/814,842, entitled "System and Method for Assigning a Business Value Rating to Documents in an Enterprise," which is herein incorporated by reference in its entirety.

One issue with granting employees access to sensitive information is that it can be damaging to a company if an end user of a secure network, who has legitimate access rights to the sensitive information, performs malicious activities such as sending the sensitive information to unauthorized persons and/or transmitting falsehoods regarding the sensitive information from the secure network. Moreover, a bad actor may hack or otherwise illegally gain access to an account of the end user and use the end user's credentials to gain access to confidential information stored on the secure network and attempt to transmit the confidential information to sources located outside of the secure network. Furthermore, it may be damaging to a company if misleading or false information regarding the organization is transmitted from an email account associated with the organization. Thus, there is a need to prevent the malicious transmission of sensitive information or misleading information to sources located outside of a secure network.

FIG. 1 depicts one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 120, mobile device 130, mobile device 140, and server 160. In some embodiments, the plurality of computing devices may include other computing devices not shown. A computing device may comprise various computing devices such as a mobile phone, laptop computer, desktop computer, or tablet computer. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as server 160, may allow a client to download information (e.g., text, audio, image, and video files) from the server or to perform a search query related to particular information stored on the server. In some cases, server 160 may act as a mail server or a file server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. In some cases, the server 160 may establish a secure connection with one or more computing devices (e.g., using a virtual private network connection). Processor 166 may comprise one or more processing elements (e.g., multiple CPUs). In one embodiment, server 160 may comprise a server for facilitating a live video conference.

One embodiment of mobile device 140 includes a network interface 145, processor 146, memory 147, camera 148, sensors 149, and display 150, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Camera 148 may capture images or video. Sensors 149 may generate motion and/or orientation information associated with mobile device 140. Sensors 149 may comprise an inertial measurement unit (IMU). Display 150 may display digital images and/or videos. Display 150 may comprise a touchscreen display.

In some embodiments, various components of mobile device 140 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 140 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In some embodiments, a mobile device, such as mobile device 140, may be in communication with a server in the cloud, such as server 160, and may provide to the server authentication information (e.g., a password associated with an end user of the mobile device) and/or user identification information (e.g., an alphanumeric user identifier) associated with the end user. In response, the server may transmit to the mobile device security protected data accessible by the end user. In one embodiment, the authentication information may be automatically determined by the mobile device based on biometric characteristics of the end user. In another embodiment, the authentication information may be automatically determined by the mobile device based on the identification of various biometric characteristics of the end user, as well as the detection of various gestures performed by the end user, and other factors such as the location of the mobile device.

In some embodiments, networked computing environment 100 may provide remote access to secure documents and applications to employees of a company (or members of an organization) in order to allow them to work without being physically present at a company location (e.g., to enable an employee to work from home or while traveling). To facilitate remote access to the secure documents and applications, a secure network connection may be established using a virtual private network (VPN). A VPN connection may allow an employee to securely access or transmit data from a private network (e.g., from a company file server or mail server) using an unsecure public network or the Internet. The VPN connection typically requires client-side software (e.g., running on the employee's remote computing device) to establish and maintain the VPN connection. The VPN client software may provide data encryption and encapsulation prior to the transmission of secure private network traffic through the Internet.

In some embodiments, sensitive information may be stored within electronic files stored on or being sent from a server, such as server 160. The electronic files may include, for example, word processing documents, spreadsheets, temporary documents, draft documents, draft emails, sent and/or received emails, instant messages, and text messages. The electronic files may also be associated with metadata or information related to the electronic file such as the creator of the file, the person to last edit the file, when the file was last updated, and groups or individuals associated with the file. In some cases, the electronic files may be associated with a business value rating that is automatically determined based on the presence of keywords (e.g., important project names or employee names) or the creator of the electronic file (e.g., an executive of a company).

Figure 2A:
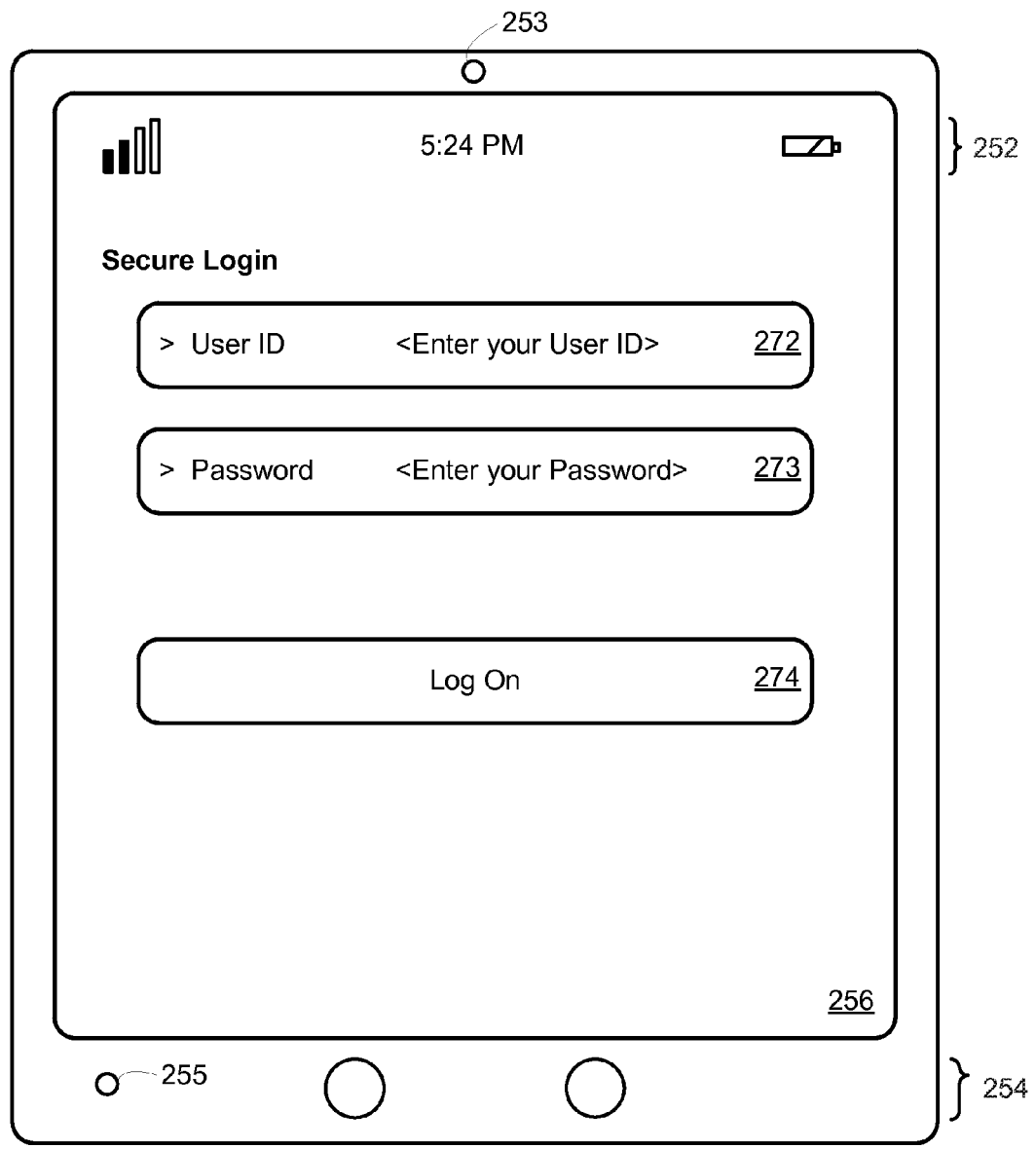
FIG. 2A depicts one embodiment of a mobile device running a client application.

FIG. 2A depicts one embodiment of mobile device 140 of FIG. 1 running a client application. As depicted, mobile device 140 includes a touchscreen display 256, physical control buttons 254, a microphone 255, and a front-facing camera 253. The touchscreen display 256 may include an LCD display for presenting a user interface to an end user of the mobile device. The touchscreen display 256 may include a status area 252 which provides information regarding signal strength, time, and battery life associated with the mobile device. Status area 252 may also provide information about an authentication level of the mobile device such as whether a particular identification has been accepted. In some embodiments, the determination of the authentication level may be based on a number of different biometric identifiers used for identifying an end user of the mobile device and/or a particular location of the mobile device (e.g., the mobile device may be located at the end user's home, office, or other frequently visited or predefined location associated with the end user). The microphone 255 may capture audio associated with the end user (e.g., the end user's voice) for determining the identity of the end user and for detecting particular words spoken by the end user. The front-facing camera 253 may be used to capture images of the end user for determining the identity of the end user and for detecting facial expressions performed by the end user.

In one embodiment, the client application may comprise a computing application for establishing a secure connection to a secure network. The client application may require a user identifier to be entered into the User ID field 272 and a corresponding password to be entered into the Password field 273. The Log On button 274 may allow an end user of mobile device 140 to submit the user credentials for establishing the secure connection (e.g., to establish a VPN connection). In some cases, the client application may require biometric identification of the end user of the mobile device. In one example, the client application may require an identification of the end user via facial recognition based on images captured by the front-facing camera 253.

In some embodiments, the client application may require continuous biometric identification (e.g., facial recognition) of the end user of the mobile device while a secure connection is established. The continuous identification of the end user may be used to detect when a person different from the end user (e.g., a child or stranger) is operating the mobile device while the secure connection is established, in which case the client application may close or terminate the secure connection.

Figure 2B:
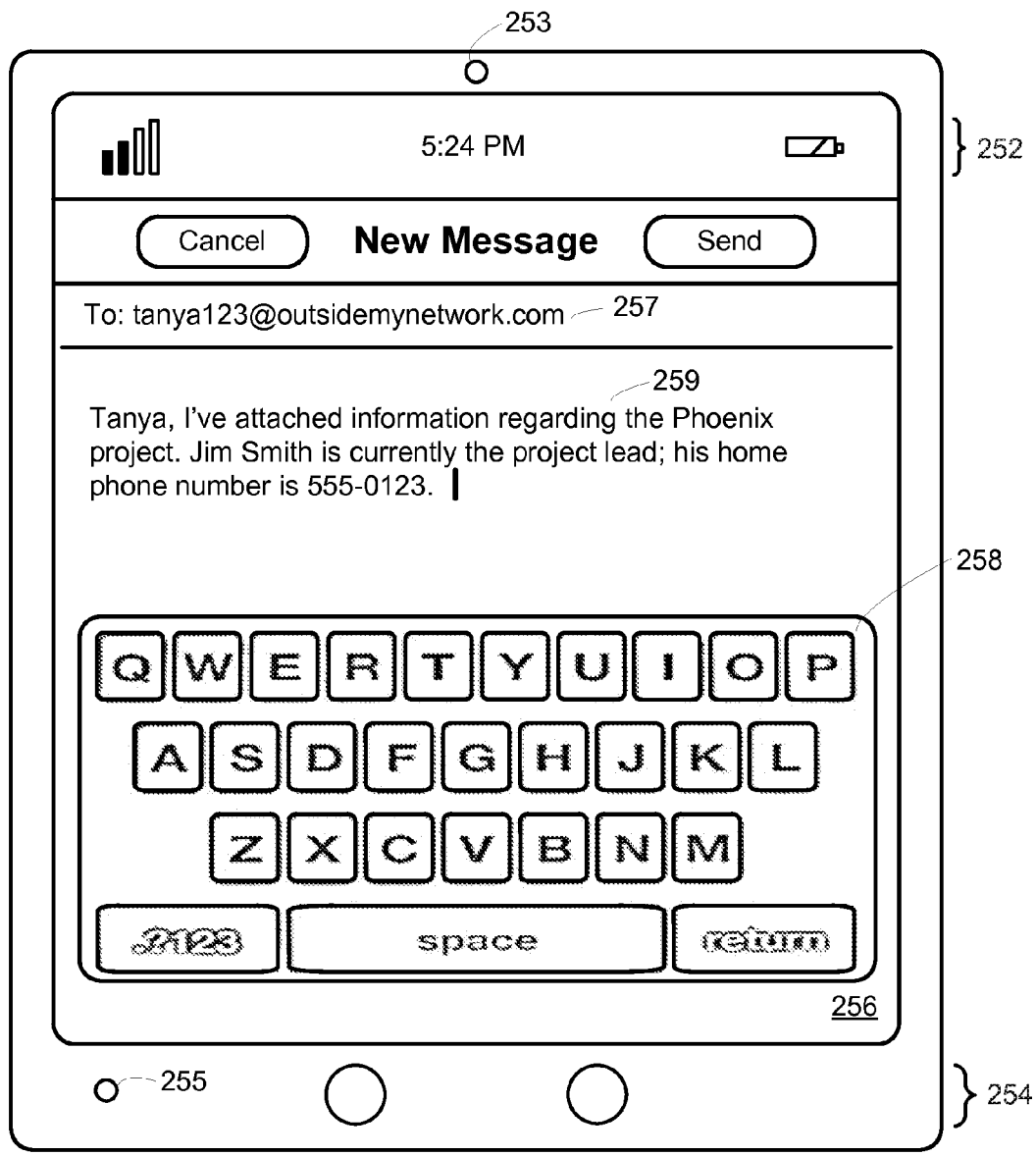
FIG. 2B depicts one embodiment of mobile device running a client application utilizing a virtual keyboard.

FIG. 2B depicts one embodiment of mobile device 140 of FIG. 1 running a client application and utilizing a virtual keyboard 258 for data entry. The virtual keyboard 258 may be invoked automatically by the client application or by selection of a particular entry field of the client application by an end user of the mobile device. As depicted, an end user of the mobile device 140 has drafted or edited an email message 259 intended to be sent to a person associated with the email address 257 (i.e., "tanya123@outsidemynetwork.com"). The email address of the intended recipient may be associated with a destination server that is located outside of a secure network. The email message 259 includes sensitive information including the code name of a secret project (i.e., "Phoenix"), the name of a key employee of a company (i.e., "Jim Smith"), and a personal phone number associated with the key employee (i.e., "555-0123"). In one embodiment, upon the detection of a suspicious activity performed by the end user of the mobile device 140, the email message 259 may be analyzed for the presence of sensitive information, such as words associated with secret projects or personal contact information. If an email message is deemed to include sensitive information, then the email message may be held in a buffer and its transmission to the intended recipient may be delayed until a mitigating action has been performed (e.g., the email has been screened and approved by a manager or human resources personnel).

In some embodiments, prior to transmission of an email message to an intended destination address, the email message may be scanned for sensitive information and if sensitive information has been identified within the email message, then audio and/or video captured from and buffered on the mobile device 140 (e.g., captured data from the two minutes previous to the end user of the mobile device hitting the send button to send the email message) may be analyzed in order to detect malicious or suspicious activity (e.g., the end user projecting anger or frustration) performed by the end user of the mobile device. In the event that a malicious or suspicious activity was detected within the buffered audio and/or video, the client application may inform a secure server of the detected activity and the secure server may perform a mitigating action prior to sending the email message to the intended recipient.

In some cases, if the client application determines that the end user has performed a suspicious activity, then other contextual information associated with the end user may be acquired such as a degree of activity associated with the end user's network account (e.g., the amount of web traffic or outgoing/incoming data through a firewall of a secure network). Short term trends in the degree of activity may be calculated and compared with baseline values associated with the end user's activities over time. In one example, a ratio of short-term data downloads to long-term data downloads may be used to identify periods where the end user is downloading more information from a secure network than is typical for the end user. The contextual information associated with the end user may also include performance review metrics and human resource metrics. The contextual information may be used to further provide indication of suspicious activities performed by the end user (e.g., increased downloads above baseline conditions or having been previously identified as a disgruntled employee by human resources personnel).

Figure 2C:
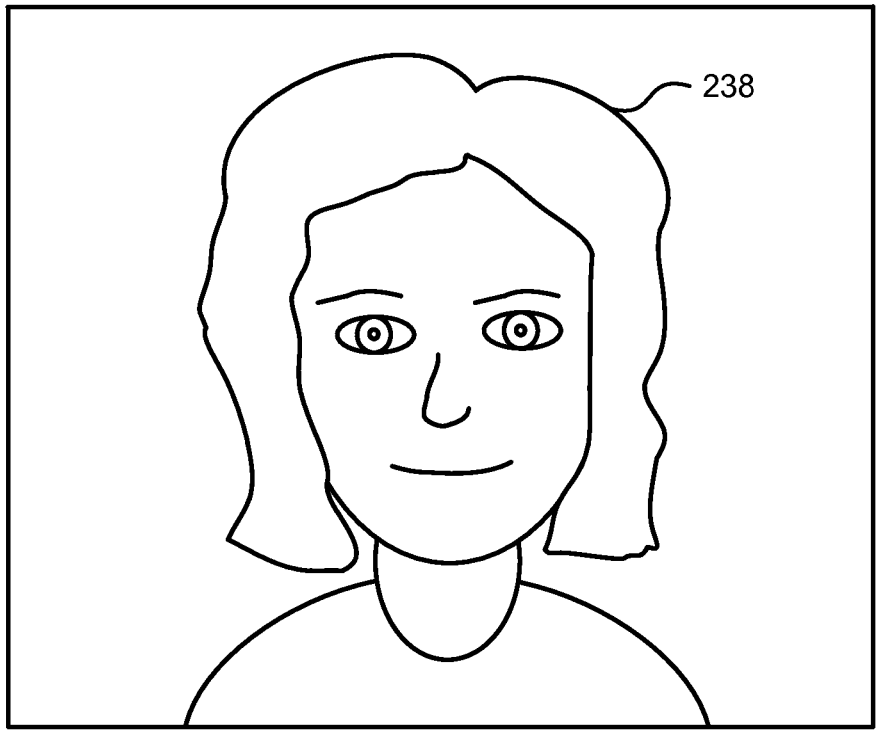
FIG. 2C depicts one embodiment of an image captured from a front-facing camera of a computing device.

FIG. 2C depicts one embodiment of an image captured from a front-facing camera of a computing device, such as front-facing camera 253 in FIG. 2A. As depicted, the image includes a representation of an end user 238 of the computing device. The image may be analyzed in order to identify the end user 238 using facial recognition techniques and to detect particular facial expressions performed by the end user (e.g., smiling) using facial expression recognition techniques.

Figure 2D:
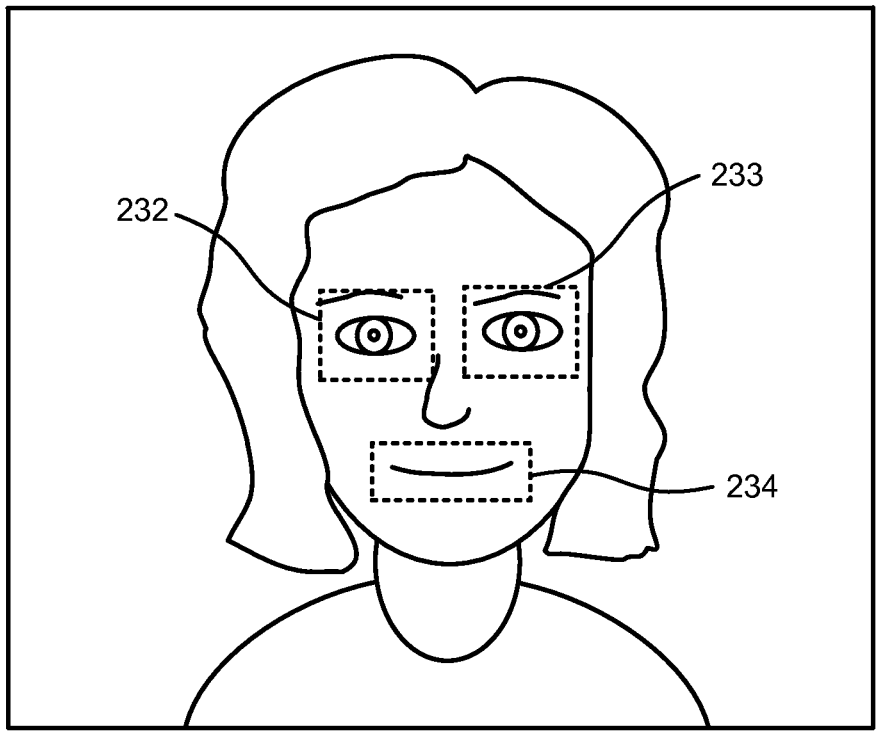
FIG. 2D depicts one embodiment of an image captured from a front-facing camera of a computing device.

FIG. 2D depicts one embodiment of the image captured from a front-facing camera of a computing device, such as front-facing camera 253 in FIG. 2A. As depicted, the image may be analyzed in order to identify facial features 232-234 associated with an end user of the computing device. The facial features 232-233 may correspond with eyes and eyebrows of the end user and facial feature 234 may correspond with the mouth of the end user. Changes in facial expressions (e.g., eyes narrowing, changes in blinking patterns, and changes in the shape of the end user's eyebrows) or changes in facial characteristics (e.g., eye dilation, changes in the size of the end user's iris, and the presence of sweat on the end user's forehead) may be used to identify stress in the end user and to detect facial expressions or other facial movements corresponding with suspicious activities. In some cases, the facial expressions or movements detected may be used to infer whether the end user is lying or performing a malicious activity.

In one embodiment, a client application may determine a degree of truthfulness based on an end user's facial expressions and movements while the end user is performing work-related tasks, such as reading information downloaded from a secure network or drafting an email message to be sent from the secure network. The client application may also consider changes in typing posture, changes in typing speed, or the detection of nervous or anxious movements as sensed using a motion sensor, such as sensors 149 in FIG. 1. For example, an end user's nervousness may be identified due to excessive finger shaking beyond a baseline level of finger shaking typically associated with the end user when the end user is controlling a touchscreen display or a virtual keyboard, such as virtual keyboard 258 of FIG. 2B.

In one embodiment, a malicious activity filter including one or more rules for determining when an end user of a computing device is performing suspicious activities while operating the computing device may be used by the client application. The one or more rules may include detecting particular facial expressions or gestures performed by the end user or detecting particular phrases expressing anger or frustration spoken by the end user. The one or more rules for determining when the end user is performing suspicious activities may also take into account the time of day, the location of the end user, and the computing device used by the end user (e.g., a phone, laptop, or desktop computing device). In some cases, baseline moods associated with the end user may correspond with different times of the day and with different locations (e.g., a first baseline mood may be associated with an end user operating a desktop computing device at work during the daytime and a second baseline mood may be associated with the end user operating a mobile device at home at night). Other baseline behaviors associated with the end user such as typical typing speeds, typical data downloads, and typical degrees of finger shaking may also be determined for different times of the day, for different locations of the end user, and for different computing devices used by the end user. The location of the computing device may be determined by acquiring GPS location information associated with the computing device used by the end user.

Figure 3A:
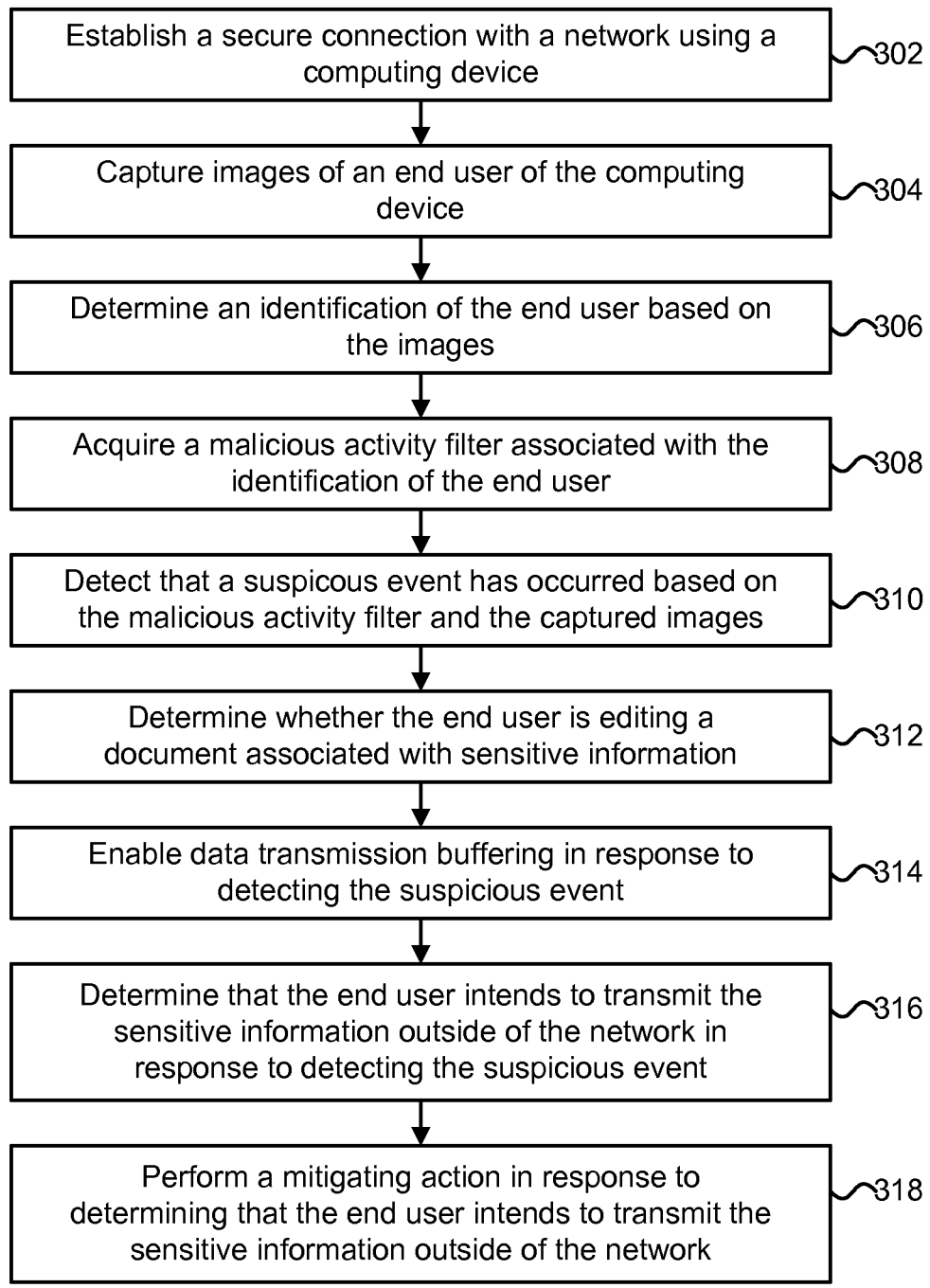
FIG. 3A is a flowchart describing one embodiment of a process for preventing the transmission of sensitive information outside of a secure network.

FIG. 3A is a flowchart describing one embodiment of a process for preventing the transmission of sensitive information outside of a secure network. In one embodiment, the process of FIG. 3A is performed by a mobile device, such as mobile device 140 in FIG. 1.

In step 302, a secure connection is established with a network using a computing device. The secure connection may comprise a VPN connection. The secure connection may provide remote access by the computing device to the network and allow for an end user of the computing device to access secure resources, files, and/or other information stored on the network. In some cases, in order for the secure connection to be established and maintained, client monitoring software running on the computing device may be required.

In step 304, images of an end user of the computing device are captured. The images may be captured using a camera, such as front-facing camera 253 in FIG. 2A. In some embodiments, video and/or audio associated with the end user may be captured while the end user operates the computing device. The video and/or audio acquired may be used to monitor the end user as the end user performs work-related tasks such as drafting emails or editing spreadsheets. In step 306, an identification of the end user is determined based on the images.

The identification of the end user may be determined by applying facial recognition techniques to the images. In one example, facial recognition techniques may be used to identify the end user based on a database of employee images.

In some embodiments, the computing device may require continuous identification of the end user while the secure connection is established. The continuous identification of the end user may be used to detect when a person different from the end user (e.g., a child or stranger) is operating the computing device while the secure connection is established, in which case the computing device may close or terminate the secure connection.

In step 308, a malicious activity filter associated with the identification of the end user is acquired. In some cases, each employee of a company (or member of an organization) may be associated with an individualized malicious activity filter. The malicious activity filter may comprise one or more rules for determining when the end user has performed a suspicious activity (e.g., an activity that requires a heightened degree of monitoring or precautions to be taken in order to prevent the transmission of sensitive information to sources outside of a network). The one or more rules may include detecting particular facial expressions or gestures performed by the end user and/or detecting particular phrases expressing anger or frustration spoken by the end user. The one or more rules for determining when the end user is performing suspicious activities may also take into account the time of day and the location of the end user. The location of the computing device may be determined by acquiring GPS location information associated with the computing device used by the end user.

In some embodiments, the malicious activity filter may be satisfied if the end user has displayed or expressed anger or frustration as determined by applying facial expression and mood detection techniques to the images. In one example, if the end user is deemed to be in an angry, frightened, or anxious mood, then the malicious activity filter may be satisfied. In another example, if the end user is deemed to be angry and they are on a watchlist for an organization (e.g., tagged as a disgruntled employee), then the malicious activity filter may be satisfied. In another embodiment, the malicious activity filter may be satisfied if the end user is deemed to be overly excited or overly happy as compared with a baseline emotional level. One embodiment of a process for acquiring a malicious activity filter is described later in reference to FIG. 3C.

In step 310, it is detected that a suspicious event has occurred based on the malicious activity filter as applied to the captured images. The suspicious event may be deemed to have occurred when the malicious activity filter has been satisfied or when a combination of one or more rules for determining that a suspicious activity has occurred has been satisfied.

In some embodiments, facial expressions or movements performed by the end user may be used to infer whether the end user is lying or performing a malicious activity. In one example, changes in facial expressions (e.g., eyes narrowing, changes in blinking patterns, and changes in the shape of the end user's eyebrows) or changes in facial characteristics (e.g., eye dilation, changes in the size of the end user's iris, and the presence of sweat on the end user's forehead) may be used to identify stress in the end user and to detect whether a suspicious event has occurred. The determination of whether a suspicious event has been detected may also take into account the end user's facial expressions and movements while the end user is performing a particular work-related task, such as reading information downloaded from a secure network or drafting an email message to be sent from the secure network.

In some cases, a suspicious event may be detected when nervous or anxious movements performed by the end user are identified. For example, excessive finger shaking beyond a baseline level of finger shaking typically associated with the end user when the end user is controlling a touchscreen display or a virtual keyboard, such as virtual keyboard 258 of FIG. 2B, may trigger the detection of a suspicious event.

In step 312, it is determined whether the end user is editing (or has recently edited) a document associated with sensitive information. In one embodiment, the document may comprise a draft email being edited, amended, or written by the end user. The document may be associated with sensitive information if any attachments to the document include keywords or phrases associated with sensitive information or if the document and/or any attachments to the documents have metadata corresponding with sensitive information. The metadata may identify a document as containing confidential information. In another embodiment, the document may comprise a project related document including confidential information. The sensitive information may comprise keywords or phrases associated with confidential or secret information. The sensitive information may be embedded within various document sources such as emails or instant messages, invention disclosure documents, draft versions of financial statements being developed for public release, and new product development documents. In some embodiments, the determination of whether a document includes sensitive information may be based on a business value rating associated with the document.

In some cases, it may be determined that the end user is viewing or reading a document associated with sensitive information based on images captured of the end user using a front-facing camera, such as front-facing camera 253 of FIG. 2A. In one embodiment, eye tracking techniques may be used to determine if the end user is reading a document. For example, the end user may be deemed to be reading the document if they are looking at a display displaying the document and their eye movements correspond with a tracking of words in the document. The triggering of mitigating actions may be performed in response to the detecting of a suspicious event performed by the end user and detecting that the end user is viewing or reading a document associated with sensitive information.

In step 314, data transmission buffering is enabled in response to detecting the suspicious event in step 310. The data transmission buffering may buffer or delay the transmission of any data from the computing device (or in the case that the document resides on and is being edited on a remote server, from the remote server) to any destinations outside of the network. In some cases, a ten minute delay may be used to allow for processing by human resources personnel (or other authorized company personnel such as the end user's manager) to the contents of any data transmission in which a business value rating or confidential information rating is above a particular threshold. In other cases, an automated authorization system may be used to make a threshold determination of whether or not to permit transmission of the document to destinations outside of the network.

In step 316, it is determined that the end user intends to transmit the sensitive information outside of the network. The determination of whether the end user intends to transmit sensitive information outside of the network may be performed in response to detecting the suspicious event in step 310. It may be determined that the end user intends to transmit the sensitive information (or a document associated with the sensitive information) outside of the network when the end user has initiated a data transfer for the sensitive information to a location outside of the network. In one embodiment, it may be determined that the end user intends to transmit sensitive information outside of the network if the end user attempts to send an email message containing the sensitive information (e.g., the end user hit a send button associated with transmission of the email message). In another embodiment, it may be determined that the end user intends to transmit sensitive information outside of the network if the end user attempts to initiate a document transfer (e.g., using FTP) to destinations located outside of the network.

In step 318, a mitigating action is performed in response to determining that the end user intends to transmit the sensitive information outside of the network. In one embodiment, the mitigating action may comprise an alert issued to human resources personnel that requires authorization by the human resources personnel before the sensitive information may be transmitted outside of the network. The mitigating action may include delaying the data transmission for a period of time corresponding with a business value rating of the data to be transmitted (e.g., delaying the intended data transmission by ten minutes if the data includes the name of a key employee or delaying the intended data transmission by 24 hours if the data includes the code name of a secret project). In another embodiment, the mitigating action may comprise an alert issued to the end user of the computing device alerting them to the fact that their intended data transmission may cause the transmission of sensitive information to a destination located outside of the network. The end user may then be required to confirm that they intend to make the data transmission.

In one embodiment, a watermark or a hidden source identifier may be attached to documents in the intended data transmission in order to provide a trail in the event that the sensitive information is leaked to sources outside of the network. The hidden source identifier may correspond with an email address of the end user or an employee number associated with the end user.

Figure 3B:
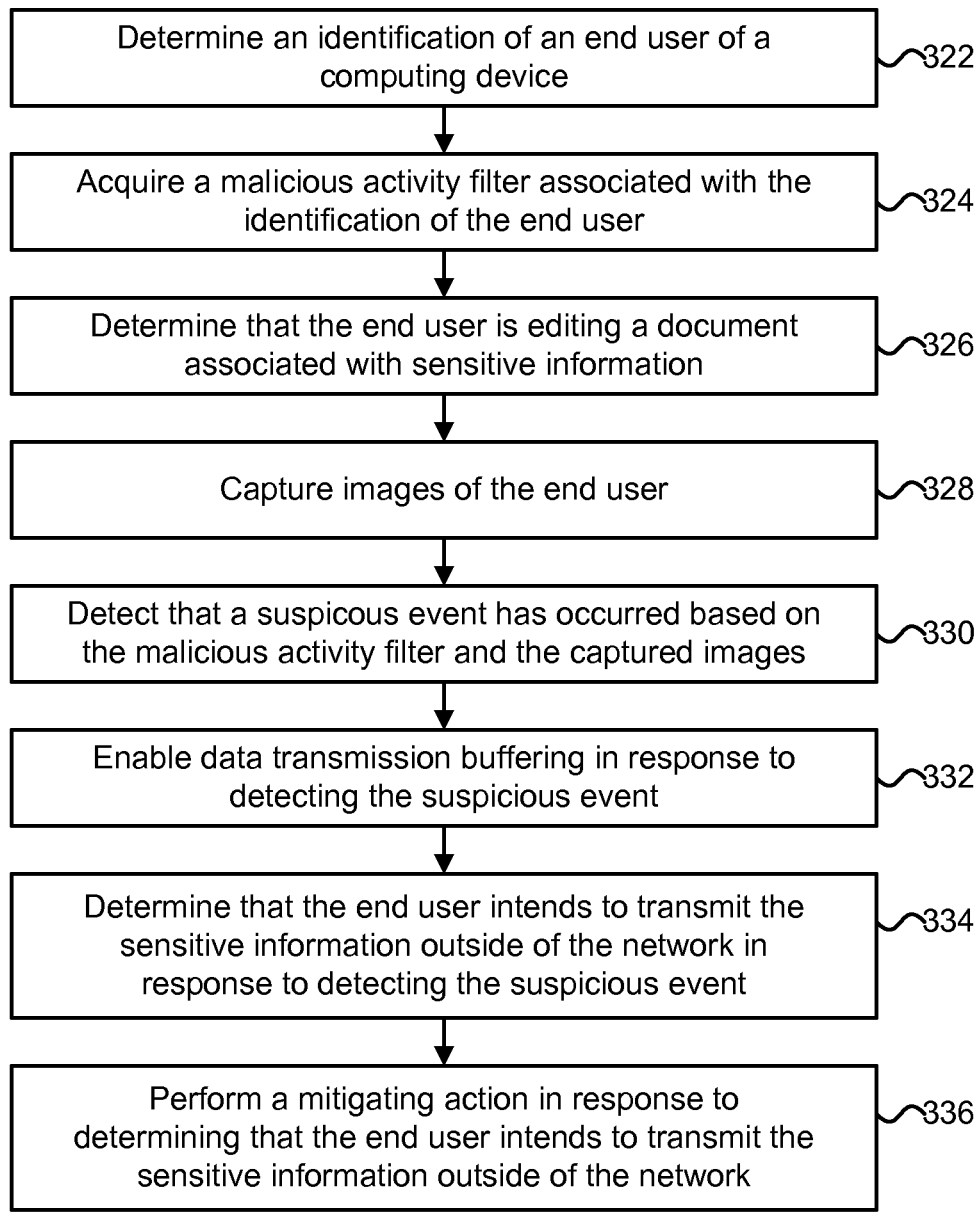
FIG. 3B is a flowchart describing an alternative embodiment of a process for preventing the transmission of sensitive information outside of a secure network.

FIG. 3B is a flowchart describing an alternative embodiment of a process for preventing the transmission of sensitive information outside of a secure network. In one embodiment, the process of FIG. 3B is performed by a mobile device, such as mobile device 140 in FIG. 1.

In step 322, an identification of an end user of a computing device is determined. The identification of the end user may be determined by applying facial recognition techniques to one or more images captured by a front facing camera of the computing device. The one or more images may be captured using a camera, such as front-facing camera 253 in FIG. 2A. In one example, facial recognition techniques may determine the identification of the end user based on a database of employee images. In some embodiments, video and/or audio associated with the end user may be simultaneously captured while the end user operates the computing device. The video and/or audio acquired may be used to monitor the end user as the end user operates the computing device. In some embodiments, the computing device may perform continuous identification of the end user in order to detect when a person different from the end user (e.g., a different employee) is operating the computing device.

In step 324, a malicious activity filter associated with the identification of the end user is acquired. In some cases, each employee of a company (or member of an organization) may be associated with an individualized malicious activity filter. The malicious activity filter may comprise one or more rules for determining when the end user has performed a suspicious activity (e.g., an activity that requires a heightened degree of monitoring or precautions to be taken in order to prevent the transmission of sensitive information to sources outside of the network). The one or more rules may include detecting particular facial expressions or gestures performed by the end user or detecting particular phrases expressing anger or frustration. The one or more rules for determining when the end user is performing suspicious activities may also take into account the time of day and the location of the end user. The location of the computing device may be determined by acquiring GPS location information associated with the computing device used by the end user.

In some embodiments, the malicious activity filter may be satisfied if the end user has displayed or expressed anger or frustration as determined by applying facial expression and mood detection techniques to the images. In one example, if the end user is deemed to be in an angry, frightened, or anxious mood, then the malicious activity filter may be satisfied. In another example, if the end user is deemed to be angry and they are on a watchlist for an organization (e.g., tagged as a disgruntled employee), then the malicious activity filter may be satisfied. One embodiment of a process for acquiring a malicious activity filter is described later in reference to FIG. 3C.

In step 326, it is determined that the end user is editing (or has recently edited) a document associated with sensitive information. In one embodiment, the document may comprise a draft email being edited, amended, or written by the end user. The document may be associated with sensitive information if any attachments to the document include keywords or phrases associated with sensitive information or if the document and/or any attachments to the documents have metadata corresponding with sensitive information. The metadata may identify a document as containing confidential information. The sensitive information may comprise keywords or phrases associated with confidential or secret information.

In one embodiment, each document that has been recently touched or edited by the end user (e.g., within the last ten minutes) may be analyzed for sensitive information. For example, all draft emails recently edited by the end user may be analyzed. In some embodiments, the determination that a document is associated with sensitive information may be based on a business value rating associated with the document.

In another embodiment, it may be determined that the end user is viewing or reading a document associated with sensitive information based on images captured of the end user using a front-facing camera, such as front-facing camera 253 of FIG. 2A. In one example, the end user may be deemed to be reading the document if they are looking at a display displaying the document and their eye movements correspond with a tracking of words in the document. The triggering of mitigating actions may be performed in response to the detecting of a suspicious event performed by the end user and detecting that the end user is viewing or reading a document associated with sensitive information.

In step 328, images of an end user of the computing device are captured. The images may be captured in response to determining that the end user is editing a document associated with sensitive information. In this case, the monitoring of the end user for the performance of malicious activities may only be performed when the end user is working on, viewing, and/or controlling documents associated with sensitive information. The document may be stored on the computing device or a remote server controlled by the computing device (e.g., in the case that the document resides on a remote server that has a secure connection with the computing device). The end user may edit the document stored on the remote server using the computing device. The images may be captured using a camera, such as front-facing camera 253 in FIG. 2A.

In step 330, it is detected that a suspicious event has occurred based on the malicious activity filter and the captured images. The suspicious event may be deemed to have occurred when the malicious activity filter has been satisfied or when a combination of one or more rules for determining that a suspicious activity has occurred has been satisfied.

In some embodiments, facial expressions or movements performed by the end user may be used to infer whether the end user is lying or performing a malicious activity. In one example, changes in facial expressions (e.g., eyes narrowing, changes in blinking patterns, and changes in the shape of the end user's eyebrows) or changes in facial characteristics (e.g., eye dilation, changes in the size of the end user's iris, and the presence of sweat on the end user's forehead) may be used to identify stress in the end user and to detect whether a suspicious event has occurred. The determination of whether a suspicious event has been detected may also take into account the end user's facial expressions and movements while the end user is performing work-related tasks such as reading information downloaded from a secure network or drafting an email message. In some cases, a suspicious event may be detected when nervous or anxious movements performed by the end user are identified. For example, excessive hand shaking beyond a baseline level of hand shaking typically associated with the end user when the end user is controlling a touchscreen display or a virtual keyboard, such as virtual keyboard 258 of FIG. 2B, may trigger the detection of a suspicious event.

In some embodiments, a suspicious event may be detected if more than one malicious activity filters associated with different individuals with a particular degree of closeness are all satisfied within a short period of time. The degree of closeness may correspond with a social graph or social networking graph. The social graph may be associated with a particular social networking service such as Facebook, LinkedIn, or Twitter. The degree of closeness may also correspond with whether the different individuals are part of a common group or organization (e.g., the individuals work on the same project team or for the same division within a company). In some cases, a density of suspicious activities (i.e., the number of suspicious events detected within a period of time) may be used to detect malicious collaboration between a plurality of individuals. In one example, a suspicious event may be detected if two or more individuals of a group who are socially connected via a degree of closeness perform suspicious activities within a particular period of time (e.g., within a ten minute period). In some embodiments, a suspicious event may be triggered based on activities performed by the plurality of individuals that would otherwise not be triggered by only the activities of one of the plurality of individuals.

In step 332, data transmission buffering is enabled in response to detecting the suspicious event in step 330. The data transmission buffering may buffer or delay the transmission of any data from the computing device to any destinations outside of the network. The data transmission buffering may buffer or delay the transmission of any data to any destinations outside of the network in the case that the document resides on a remote server of the network that has a secure connection with the computing device.

In some cases, a ten minute delay may be used to allow for processing by human resources personnel (or other authorized company personnel such as the end user's manager) to the contents of any data transmission in which a business value rating or confidential information rating is above a particular threshold. In other cases, an automated authorization system may be used to make a threshold determination of whether or not to permit transmission of the document to destinations outside of the network.

In step 334, it is determined that the end user intends to transmit the sensitive information outside of the network. The determination of whether the end user intends to transmit sensitive information outside of the network may be performed in response to detecting the suspicious event in step 330. In one embodiment, it may be determined that the end user intends to transmit sensitive information outside of the network if the end user attempts to send an email message containing the sensitive information (e.g., the end user hit a send button associated with transmission of the email message). In another embodiment, it may be determined that the end user intends to transmit sensitive information outside of the network if the end user attempts to initiate a document transfer (e.g., using FTP) to sources located outside of the network.

In step 336, a mitigating action is performed in response to determining that the end user intends to transmit the sensitive information outside of the network. In one embodiment, the mitigating action may comprise an alert issued to human resources personnel that requires authorization by the human resources personnel before the sensitive information may be transmitted outside of the network. The mitigating action may include delaying the data transmission for a period of time corresponding with a business value rating of the data to be transmitted (e.g., delaying the intended data transmission by ten minutes if the data includes the name of a key employee or delaying the intended data transmission by 24 hours if the data includes the code name of a secret project). In another embodiment, the mitigating action may comprise an alert issued to the end user of the computing device alerting them to the fact that their intended data transmission may cause the transmission of sensitive information to sources located outside of the network. The end user may then be required to confirm that they intend to make the data transmission.

Figure 3C:
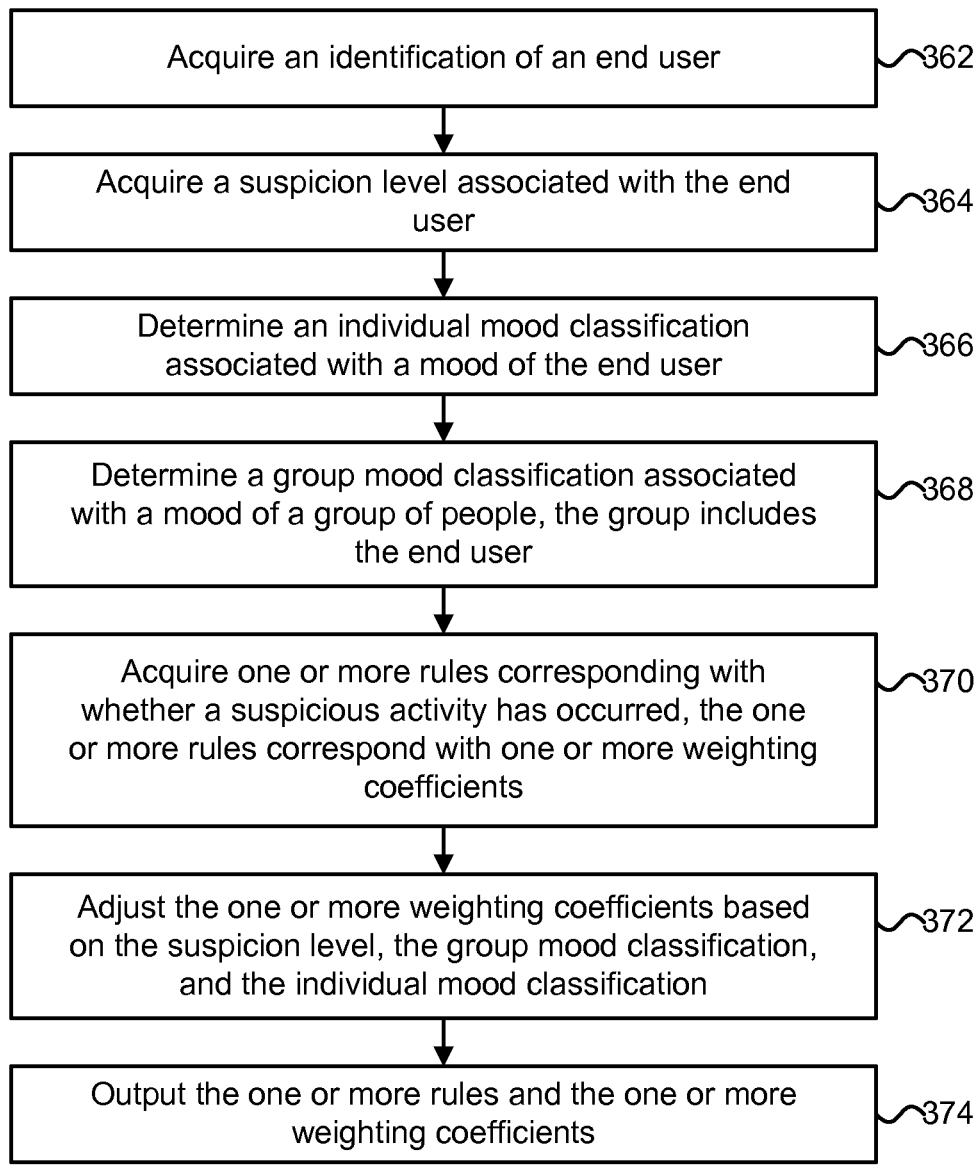
FIG. 3C is a flowchart describing one embodiment of a process for acquiring a malicious activity filter associated with an end user.

FIG. 3C is a flowchart describing one embodiment of a process for acquiring a malicious activity filter associated with an end user. The process described in FIG. 3C is one example of a process for implementing step 308 in FIG. 3A or for implementing step 324 in FIG. 3B. In one embodiment, the process of FIG. 3C is performed by a mobile device, such as mobile device 140 in FIG. 1.

In step 362, an identification of an end user is acquired. The identification may comprise, for example, a user name or employee number. In step 364, a suspicion level associated with the end user is acquired. In one embodiment, the suspicion level may be set based on whether the end user is on a watchlist associated with an organization or has otherwise been tagged as a person of interest by the organization.

In step 366, an individual mood classification associated with a mood of the end user is determined. The mood of the end user may be determined over a period of time (e.g., within a four hour period or over a 24-hour period). The individual mood classification may be determined by applying facial expression and mood detection techniques to captured images of the end user over the period of time. The individual mood classification may classify a mood of the end user as angry, frustrated, sad, anxious, neutral, or happy.

In some cases, the individual mood classification may be determined based on baseline mood characteristics associated with typical end user facial expressions that occur during different times of the day and/or when the end user is working in different locations (e.g., the number of times that the end user typically makes a sad face or displays anger may be lower at night at home than during the day at work). Other baseline behaviors associated with the end user such as typical degrees of finger (or hand) shaking during different times of the day or when in different locations may be taken into account when determining the individual mood classification. The location of the end user may be determined by acquiring GPS location information associated with a mobile device used by the end user (e.g., the end user's cell phone).

In one embodiment, images of the end user may be captured periodically (e.g., every second or every 30 seconds) while the end user is using a computing device. In some cases, the images may be captured using front-facing cameras associated with multiple computing devices and aggregated during the course of a mood sampling period. For example, a first camera associated with a desktop computer at work may capture a first set of images of the end user and a second camera associated with a mobile phone of the end user may capture a second set of images of the end user. The individual mood classification corresponding with a first mood sampling period may then be determined by applying facial expression and mood detection techniques to the first set of images and the second set of images. In some cases, the individual mood classification may be determined using captured images, video, and/or audio of the end user during the mood sampling period. In one example, captured audio of the end user may be used to detect particular words spoken by the end user.

In step 368, a group mood classification associated with a mood of a group of people is determined. The group may include the end user or be a group affiliated with the end user. The group of people may comprise a company as a whole, a division within a company, or a team of people designated to work on a particular task. In one embodiment, the group mood classification may correspond with a most frequent classification of a plurality of individual mood classifications associated with the group of people. Individual mood classifications may comprise a numerical value associated with a mood classification spectrum. For example, at a low end of the mood classification spectrum may be anger and sadness, in the middle of the mood classification spectrum may be neutral, and at a high end of the mood classification spectrum may be happiness. In one embodiment, the mood classification spectrum may correspond with a numerical range from 1 to 100 with a 50 being assigned to a neutral mood classification. In the case that individual mood classifications are assigned a numerical value, the group mood classification may correspond with a weighted average of a plurality of individual mood classifications. In one example, the weights given to the weighted average may be based on a member's seniority, rank, grade level, and/or position within an organization. One embodiment of a process for determining a group mood classification is described later in reference to FIG. 6C.

In step 370, one or more rules corresponding with whether a suspicious activity has occurred are acquired. The one or more rules may be part of a suspicious activity filter (or malicious activity filter). The one or more rules may correspond with one or more weighting coefficients. The one or more weighting coefficients may be used to weigh various factors or rules when determining whether a suspicious activity filter has been satisfied.

In some embodiments, the one or more rules may include detecting particular facial expressions or gestures (facial gestures, body gestures, and/or hand gestures) performed by the end user or detecting particular phrases spoken by the end user expressing anger or frustration. The one or more rules for determining when the end user is performing suspicious activities may also take into account the time of day and the location of the end user. The location of the end user may be determined by acquiring GPS location information associated with a mobile device used by the end user.

In step 372, the one or more weighting coefficients are adjusted based on the suspicion level, the group mood classification, and the individual mood classification. In one embodiment, periods of time during which a reduction in force occurs, employee layoffs occur, poor financial results are reported, or company stock decreases significantly in value may correspond with a group mood classification that classifies a mood of the group as anxious or sad. In some cases, the group mood classification may be set by human resources personnel or automatically determined via the aggregation and weighting of a plurality of individual mood classification. Periods of time that include dates that are close to project deadlines may also cause the group mood classification to be in an anxious or sad state. When the group mood classification classifies a mood of the group as a whole to be anxious or sad, then the one or more weighting coefficients may be increased in order to perform a heightened degree of end user monitoring and to trigger mitigating actions to be performed for lower degrees of suspicious activity. In some cases, the one or more weighting coefficients may be adjusted such that a suspicious activity filter may be satisfied and trigger mitigating actions for lower degrees of suspicious activities if an employee has been tagged as a person of interest (e.g., tagged as a disgruntled employee) or if the group mood classification corresponds with an anxious or sad state.

In step 374, the one or more rules and the one or more weighting coefficients are outputted. In one embodiment, the one or more rules and the one more weighting coefficients may be outputted as a part of a suspicious activity filter associated with an individual.

Figure 4A:
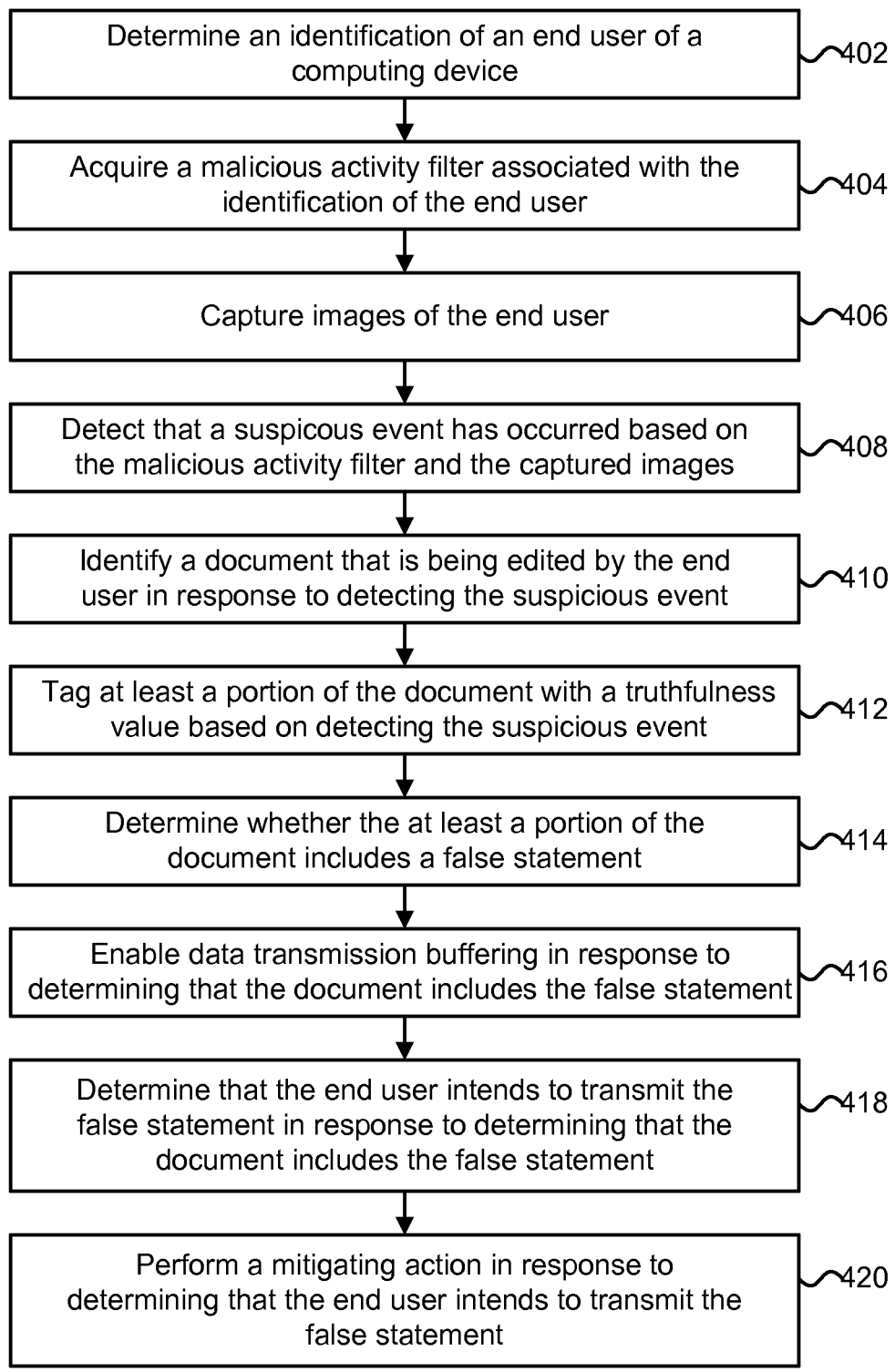
FIG. 4A is a flowchart describing one embodiment of a process for preventing the transmission of false statements.

FIG. 4A is a flowchart describing one embodiment of a process for preventing the transmission of false statements. In one embodiment, the process of FIG. 4A is performed by a mobile device, such as mobile device 140 in FIG. 1.

In step 402, an identification of an end user of a computing device is determined. The identification of the end user may be determined by applying facial recognition techniques to one or more images captured by a front facing camera of the computing device. The one or more images may be captured using a camera, such as front-facing camera 253 in FIG. 2A. In one example, facial recognition techniques may determine the identification of the end user based on a database of employee images. In some embodiments, video and/or audio associated with the end user may be simultaneously captured while the end user operates the computing device.

In step 404, a malicious activity filter associated with the identification of the end user is acquired. The malicious activity filter may comprise one or more rules for determining when the end user has performed a suspicious activity (e.g., an activity that requires a heightened degree of monitoring or precautions to be taken in order to prevent the improper transmission of information to others). The one or more rules may include detecting particular facial expressions or gestures performed by the end user or detecting particular phrases expressing anger or frustration. The one or more rules for determining when the end user is performing suspicious activities may also take into account the time of day and the location of the end user. The location of the computing device may be determined by acquiring GPS location information associated with the computing device used by the end user.

In some embodiments, the malicious activity filter may be satisfied if the end user has displayed or expressed anger or frustration as determined by applying facial expression and mood detection techniques to the images. In one example, if the end user is deemed to be in an angry, frightened, or anxious mood, then the malicious activity filter may be satisfied. In another example, if the end user is deemed to be angry and they are on a watchlist for an organization (e.g., tagged as a disgruntled employee), then the malicious activity filter may be satisfied. In another embodiment, the malicious activity filter may be satisfied if the end user is deemed to be overly excited or overly happy. One embodiment of a process for acquiring a malicious activity filter was described previously in reference to FIG. 3C.

In step 406, images of the end user are captured. The images may be captured using a camera, such as front-facing camera 253 in FIG. 2A. In some embodiments, video and/or audio associated with the end user may be captured while the end user operates the computing device. The video and/or audio acquired may be used to monitor the end user as the end user operates the computing device (e.g., performs work-related tasks such as drafting emails or editing spreadsheets). In some embodiments, the images of the end user may be captured using a plurality of cameras located around a work environment. In one example, a plurality of cameras may be located within an office of the end user or in meeting rooms within the work environment.

In step 408, it is detected that a suspicious event has occurred based on the malicious activity filter and the captured images. The suspicious event may be deemed to have occurred if the malicious activity filter has been satisfied or when a combination of one or more rules for determining that a suspicious activity has occurred have been satisfied. In some cases, facial expressions and hand gestures performed by the end user may be used to infer whether the end user is lying or performing a malicious activity. In one example, changes in facial expressions (e.g., eyes narrowing, changes in blinking patterns, and changes in the shape of the end user's eyebrows) or changes in facial characteristics (e.g., eye dilation, changes in the size of the end user's iris, and the presence of sweat on the end user's forehead) may be used to identify stress in the end user and to detect whether a suspicious event has occurred. The determination of whether a suspicious event has been detected may also take into account the end user's facial expressions and movements while the end user is performing a particular work-related task, such as reading information downloaded from a secure network or drafting an email message to be sent from the secure network. In some cases, a suspicious event may be detected when nervous or anxious movements performed by the end user are detected. In one example, excessive finger shaking beyond a baseline level of finger shaking typically associated with the end user when the end user is controlling a touchscreen display or a virtual keyboard, such as virtual keyboard 258 of FIG. 2B, may trigger the detection of a suspicious event. In another example, the performance of excessive nervous or anxious gestures or movements such as excessive pacing, nail-biting, or hair pulling beyond a baseline level of activity may trigger the detection of a suspicious event.

In step 410, a document (or other electronic file) that is being edited by the end user is identified in response to detecting the suspicious event. In one environment, the document may comprise an email message (or email) being drafted by the end user. The document may also comprise an email message, word processing document, spreadsheet, or presentation document that was amended by the end user within a recent time period (e.g., within the last five minutes). In one embodiment, the document may comprise the electronic file that is the highest active document in an application stack or workspace.

In step 412, at least a portion of the document is tagged with a truthfulness value based on the detection of the suspicious event. The truthfulness value may indicate whether a portion of the document (e.g., a paragraph) is definitely true, definitely false, or is associated with a degree of truthfulness. In one embodiment, a portion of the document may be tagged with a degree of truthfulness that corresponds with a degree of deviation in meaning between the portion of the document being tagged and a reference statement.

In some embodiments, the at least a portion of the document may be tagged with a truthfulness value based on whether the end user has performed a suspicious event while drafting or editing the at least a portion of the document. In one example, if the end user performed a particular facial expression while writing a particular portion of the document (e.g., while writing a particular sentence or paragraph), then the truthfulness value may be set based on the particular facial expression. When the end user performs a facial expression that typically indicates potential lying or nervousness while drafting a portion of the document, then the truthfulness value may be set to indicate uncertainty with regards to the truthfulness of statements made by the end user.

In step 414, it is determined whether the at least a portion of the document includes a false statement. A document may be deemed to include a false statement if a first meaning corresponding with a statement made within the document (represented as a first semantic model) conflicts with a second meaning of a reference statement (represented as a second semantic model). In one embodiment, the document may be parsed for keywords or phrases corresponding with sensitive information, confidential information, or personal information. Once the keywords or phrases have been parsed, then natural language processing techniques (e.g., natural language understanding techniques or machine reading comprehension techniques) may be applied to identify a sentence (or clause) including a keyword and to identify one or more possible semantics corresponding with the sentence. After the natural language processing techniques have been applied to the document of interest, then one or more reference documents may be analyzed in order to detect semantic discrepancies between the document and the one or more reference documents. In some cases, the one or more reference documents may be deemed to include only true statements and any deviation of meaning found in the document may be deemed a false statement. In some cases, a degree of deviation may be determined and a false statement may be detected only if the degree of deviation is above a threshold value.

In one embodiment, the one or more reference documents may comprise electronic files stored on a secure network or stored on the computing device. The one or more reference documents may comprise web pages and email messages that have been accessed by the end user. In another embodiment, an Internet search or intranet search may be performed to identify one or more reference documents. One embodiment of a process for determining whether a portion of a document includes a false statement is described later in reference to FIG. 4C.

In step 416, data transmission buffering is enabled. In one embodiment, the data transmission buffering may be enabled in response to detecting the suspicious event in step 408. In another embodiment, the transmission buffering may be enabled in response to determining that the document includes the false statement in step 414. The data transmission buffering may buffer or delay the transmission of any data to any destination outside of the network. In some cases, a ten minute delay may be used to allow for processing by human resources personnel to the contents of any data transmission in which a business value rating or confidential information rating is above a particular threshold.

In step 418, it is determined that the end user intends to transmit the document or a portion of the document containing the false statement. In one embodiment, the determination of whether the end user intends to transmit the false statement may be performed in response to determining that the document includes the false statement. It may be determined that the end user intends to transmit the false statement when the end user has initiated a data transfer. In one embodiment, it may be determined that the end user intends to transmit the false statement if the end user attempts to send an email message containing the false statement (e.g., the end user selects a send button associated with transmission of the email message). In another embodiment, it may be determined that the end user intends to transmit the false statement if the end user attempts to initiate a document transfer (e.g., using FTP).

In some embodiments, it is determined that the end user intends to transmit the document (or a portion of the document) containing the false statement when the end user initiates a data transfer to a shared location (e.g., saves a file or transmits a file to a location on an external file system or website that is accessible by multiple persons). In one example, the data transfer may correspond with a file transfer to a cloud storage service or online document sharing service. As the data transfer may be performed after the end user has saved data to be transferred locally on their local computing device, in some cases, data files (e.g., word processing files, spreadsheet files, or image files) may be tagged as containing a false statement (or an associated degree of deviation) prior the end user initiating the data transfer. In one example, a document may be tagged with a truthfulness value (or retagged with an updated truthfulness value) every time the document is saved (e.g., either explicitly saved by an end user or via an auto-save utility).

In step 420, a mitigating action is performed in response to determining that the end user intends to transmit the false statement. In one embodiment, the mitigating action may comprise an alert issued to human resources personnel that requires authorization by the human resources personnel before the document may be transmitted outside of a secure network. The mitigating action may include delaying the data transmission for a period of time corresponding with a business value rating of the document to be transmitted (e.g., delaying the transmission of the document by an hour if the document includes a false statement regarding a key project or employee). In another embodiment, the mitigating action may comprise an alert issued to the end user of the computing device alerting them to the fact that their intended data transmission includes a false statement. The end user may then be required to confirm that they intend to make the data transmission.

In one embodiment, a watermark or a hidden source identifier may be attached to documents in the intended data transmission in order to provide a trail in the event that the false statement is transmitted to destinations outside of a network. The hidden source identifier may correspond with an email address of the end user or an employee number associated with the end user.

In some embodiments, the document including a statement that has been determined to be a false statement may be annotated with information associated with one or more reference documents. In one example, the portion of the document including a false statement may be updated with a link to the one or more reference documents to which the false statement is attributed.

Figure 4B:
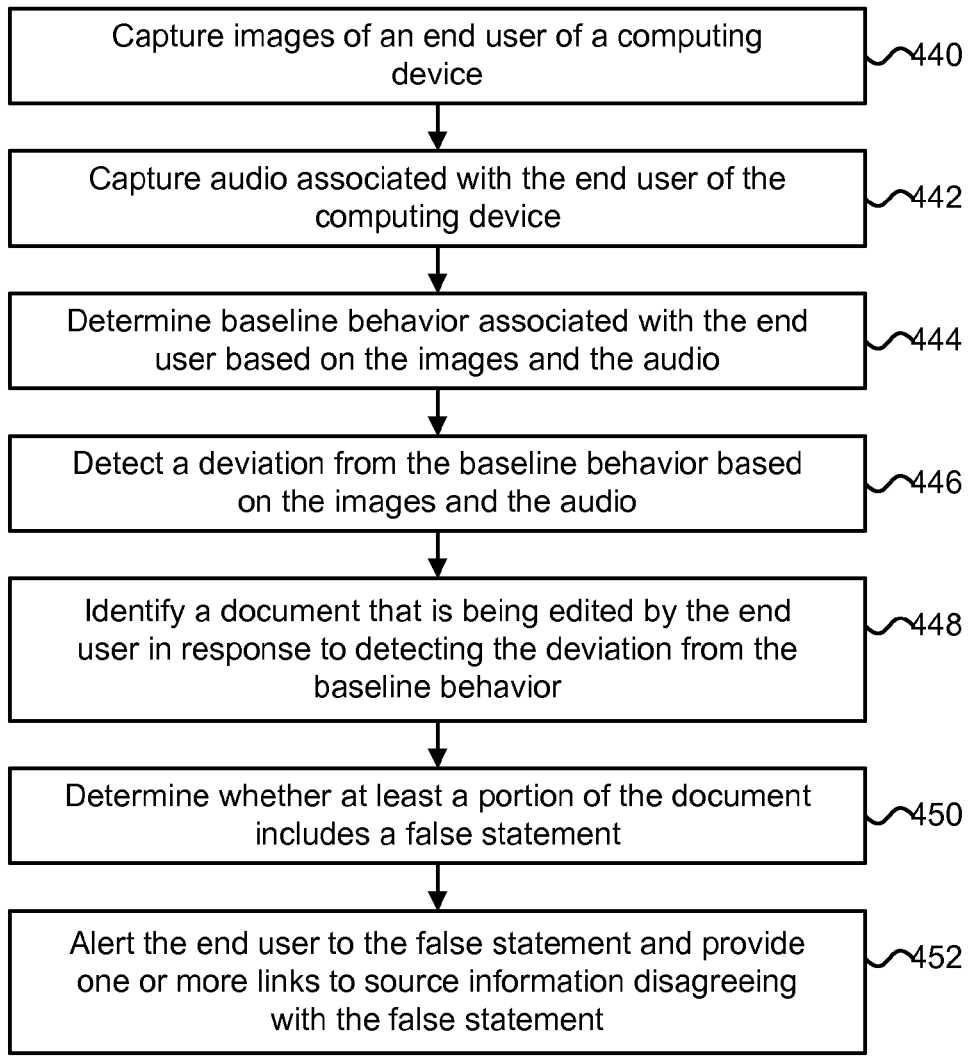
FIG. 4B is a flowchart describing an alternative embodiment of a process for preventing the transmission of false statements.

FIG. 4B is a flowchart describing an alternative embodiment of a process for preventing the transmission of false statements. In one embodiment, the process of FIG. 4B is performed by a mobile device, such as mobile device 140 in FIG. 1.

In step 440, images of an end user of a computing device are captured. The images may be captured using a front-facing camera mounted on or embedded with the computing device. In step 442, audio associated with the end user of the computing device is captured. The audio may be captured using a microphone integrated with the computing device.

In step 444, baseline behavior associated with the end user is determined based on the images and the audio. The baseline behavior may be derived over a first period of time (e.g., over a week of observation or a month of observation). The baseline behavior may comprise metrics including a median individual mood classification associated with the end user and/or the most frequent mood classification associated with the end user during the first period of time. The baseline behavior associated with the end user may correspond with different times of the day and with different locations (e.g., a first baseline behavior may be associated with an end user operating a computing device at work during the daytime and a second baseline behavior may be associated with the end user operating the computing device or a different computing device at home at night). Other baseline behaviors associated with the end user such as typical typing speeds, typical data downloads, and typical degrees of finger shaking may also be determined for different times of the day and for different locations. The location of the end user may be determined by acquiring GPS location information associated with a computing device used by the end user.

In step 446, a deviation from the baseline behavior is detected based on the images and the audio. In one embodiment, a deviation may be detected if an individual mood classification of the end user is different from a baseline individual mood classification (e.g., a median mood classification or the individual mood classification with the highest frequency during the first period of time) associated with the end user. In some cases, on a weekly basis, an individual mood classification may be determined for the end user. The individual mood classification may depend on a frequency of particular facial expressions performed by the end user during a sampling period subsequent to the first period of time (i.e., after the time period associated with the baseline mood classification). On a yearly basis, a baseline individual mood classification may correspond with the median individual mood classification or the most frequent mood classification associated with the end user over the course of the year. When the individual mood classification for a particular week is different from the baseline individual mood classification, then a deviation from baseline behavior may be detected. In other cases, a baseline individual mood classification may be computed every week and individual mood classifications may be computed every hour.

In step 448, a document that is being edited by the end user is identified in response to detecting the deviation from the baseline behavior. The document may comprise a draft email message, a word processing document or other electronic file. In step 450, it is determined whether at least a portion of the document includes a false statement. In one embodiment, the document may be deemed to include a false statement if a first meaning corresponding with a statement made within the document (represented as a first semantic model) conflicts with a second meaning of a reference statement (represented as a second semantic model). One embodiment of a process for determining whether a portion of a document includes a false statement is described later in reference to FIG. 4C.

In step 452, an alert is issued to the end user regarding the false statement. The end user may also be provided with one or more links to source information disagreeing with the false statement (e.g., a link to a reference document associated with a true statement).

Figure 4C:
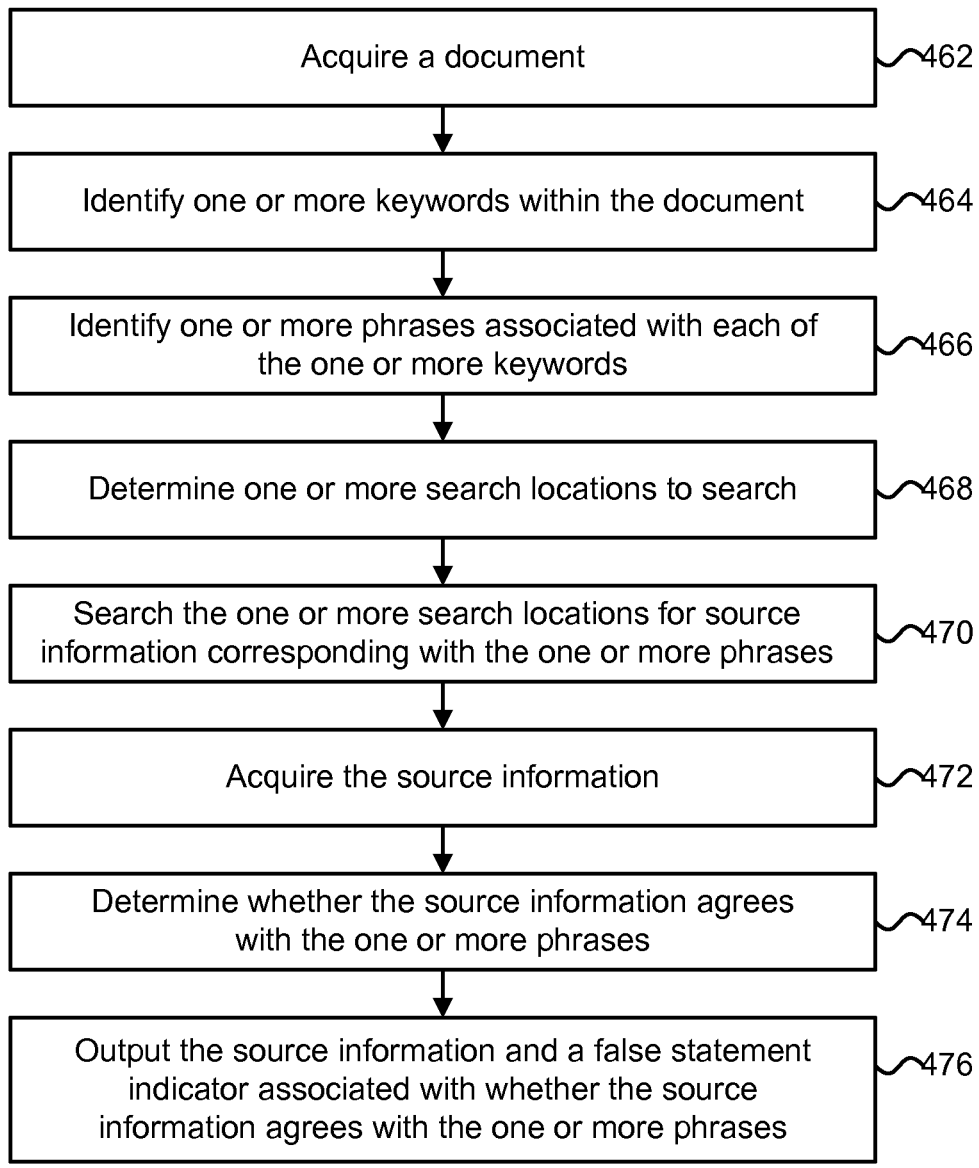
FIG. 4C is a flowchart describing one embodiment of a process for determining whether a document includes a false statement.

FIG. 4C is a flowchart describing one embodiment of a process for determining whether a document includes a false statement. The process described in FIG. 4C is one example of a process for implementing step 414 in FIG. 4A or for implementing step 450 in FIG. 4B. In one embodiment, the process of FIG. 4C is performed by a mobile device, such as mobile device 140 in FIG. 1.

In step 462, a document is acquired. The document may correspond with an email or word processing document that is open on a computing device used by the end user or is being actively edited by the end user using the computing device. In step 464, one or more keywords are identified within the document. The one or more keywords may correspond with confidential information or key business or organizational terms that are predefined by human resources personnel. The one or more keywords may be identified within the document using natural language processing techniques (e.g., language parsing). In step 466, one or more phrases associated with each of the one or more keywords are identified. The one or more phrases may be identified using natural language processing techniques. In one example, a sentence including a particular keyword may be identified as a phrase.

In step 468, one or more search locations are determined. The one or more search locations may correspond with locations on a network or computing system in which to find reference documents for comparing the one or more phrases. The one or more search locations may correspond with locations on the Internet (e.g., a set of publicly accessible webpages) or a company intranet. The one or more search locations may correspond with file server locations on a secure network or particular files on a data storage system. In one embodiment, the one or more search locations may correspond with a file server and an intranet for an organization to which an end user of a computing device is affiliated. The one or more search locations may also comprise one or more computing devices used by the end user (i.e., local hard drives).

In some cases, the one or more search locations may be filtered by searching an end user's webpage viewing history, network viewing history, history of file server accesses, history of accesses to documents located on a secure network, or a list of previously accessed documents by the end user. The end user's emails (drafted, sent, and received) may comprise one of the locations to be searched for reference information.

In step 470, the one or more networks are searched for source information corresponding with the one or more phrases. The source information may comprise one or more reference documents that may be deemed to include only true statements and any deviation of meaning found in the document acquired in step 462 may be deemed a false statement.

In step 472, the source information is acquired. In one example, the source information may be acquired from a secure file server. In another example, the source information may be acquired from the Internet. In step 474, it is determined whether the source information agrees with (or is semantically consistent with) the one or more phrases. The determination of whether the source information agrees with the one more phrases may comprise applying natural language processing techniques to the source information and the one or more phrases. In one example, the natural language processing techniques may first be applied to the one or more phrases (from the document), then the source information (e.g., a reference document) may be analyzed in order to detect semantic discrepancies between the one or more phrases and the source information. In step 476, a false statement indicator associated with whether the source information agrees with or is consistent with the one or more phrases is outputted. The source information or a link to the source information may also be outputted.

Figure 5A:
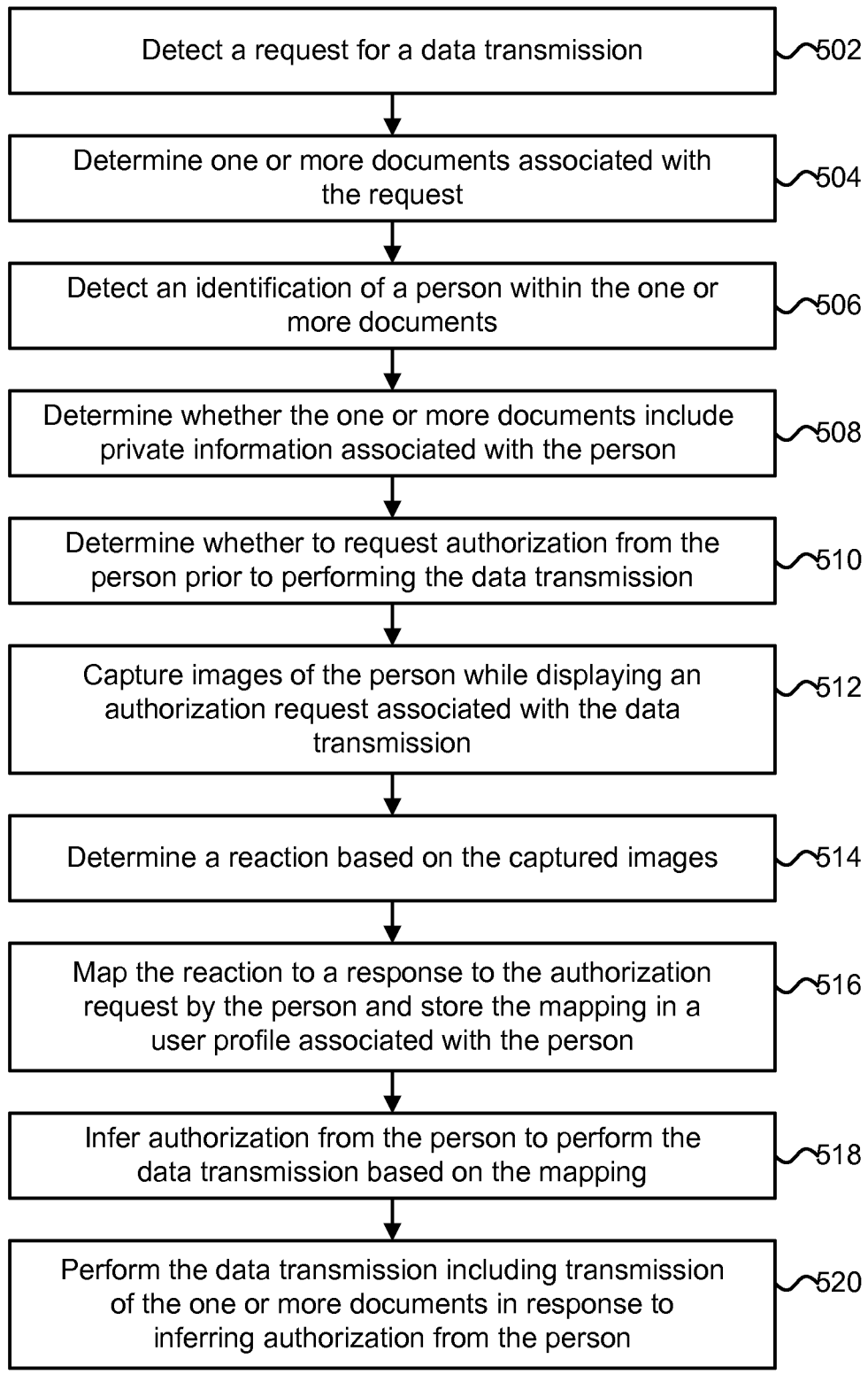
FIG. 5A is a flowchart describing one embodiment of a process for preventing the transmission of private information.

FIG. 5A is a flowchart describing one embodiment of a process for preventing the transmission of private information. In one embodiment, the process of FIG. 5A is performed by a mobile device, such as mobile device 140 in FIG. 1.

In step 502, a request for a data transmission is detected. In one embodiment, the request may comprise a request to transmit a document over a network. In one example, the request may comprise a request to transmit an email message (e.g., an end user may hit a send button associated with transmission of the email message). In another example, the request may comprise a request to initiate a document transfer (e.g., using FTP) to computers located outside of a network.

In step 504, one or more documents associated with the request are determined. The one or more documents may include an email message or word processing document. In step 506, an identification of a person within the one or more documents is detected. The identification of the person may include a name associated with the person or an identification number associated with the person (e.g., a Social Security number).

In step 508, it is determined whether the one or more documents include private information associated with the person. In one embodiment, private information may comprise information associated with the person that is not publicly available. In one example, the private information may include the person's Social Security number, private home address, private phone number, medical records, and/or financial records. The private information may be identified within the one or more documents using keyword matching, string matching, or natural language processing techniques.

In step 510, it is determined whether to request authorization from the person prior to performing the data transmission. In one embodiment, private information may be classified as always requiring authorization before transmission, never requiring authorization before transmission, or authorization may be inferred based on the person's authorization history.

In step 512, images of the person are captured while displaying an authorization request associated with the data transmission. The images may be captured using a front-facing camera associated with a computing device used to display the authorization request to the end user. In step 514, a reaction is determined based on the captured images. The reaction may be determined based on facial expressions and/or gestures performed by the end user while the end user reads the authorization request. The reaction may be deemed to correspond with an inferred approval if the person accepts the authorization request and displays facial expressions that correspond with a neutral or happy emotional state. The reaction may be deemed to correspond with an inferred disapproval if the person rejects the authorization or if the person accepts the authorization request but displays facial expressions that correspond with an angry or frustrated emotional state.

In step 516, the reaction is mapped to a response to the authorization request by the person and stored in a user profile associated with the person. For example, the user profile may include a mapping of an end user's reaction to an authorization request associated with their medical records. The mapping may be stored on a per requestor basis (e.g., the mapping may be unique to a third party requesting the private information). The mapping may also correspond with a particular group identifier (e.g., persons associated with a health care organization or company). For example, an end user's reaction to an authorization request for their medical records by someone identified as belonging to a health care organization may be different from an authorization request for their medical records by a member of the public.

In one example, the private information associated with a person may comprise medical records and a request for documents including the private information may be made by a medical researcher. In this case, a mapping of the person's reaction to an authorization request for access to their medical records by the medical researcher may be stored in the person's user profile. The person's user profile may be stored on a server associated with the person's health care provider.

In step 518, authorization from the person to perform the data transmission is inferred based on the mapping. One embodiment of a process for inferring authorization is described later in reference to FIG. 5C. In step 520, the data transmission is performed including transmission of the one or more documents in response to inferring authorization from the person. In one example, the private information associated with a person may comprise their private home address and a request for a webpage including the private information may be made by the third party to a social networking website. The social networking website may store a user profile associated with the person and infer authorization to provide access to the webpage including the person's private home address based on mappings associated with the person's private home address stored in the user profile. In one embodiment, a dynamically constructed webpage may be generated that includes portions of a document including private information up to a level of authorization (i.e., the rest of the document associated with higher authorization levels may be hidden and not released). In one example, a dynamically constructed webpage may provide access to a person's private home address, but not their Social Security number.

In some embodiments, the person's reaction to an authorization request may be classified according to the identity, group identifier (e.g., persons associated with a particular organization or company), role (e.g., an employment classification such as manager), certifications, credentials, referrals (e.g., from trusted sources who can vouch for the requestor), location, and time of day of the requesting party. The classification of the requesting party may be used to automate subsequent responses from other requesting parties with similar characteristics to those parties for which a reaction has already been captured and stored in a user profile (e.g., it may be inferred that a person's reaction to an authorization request for different people associated with the same role or credentials may be the same). In one example, a user profile may include a mapping associated with a particular third party (e.g., a first person affiliated with a health care organization) and a requesting third party (e.g., a second person affiliated with the health care organization) may comprise a third party different from the particular third party In some embodiments, a business value rating, confidential information rating, semantic similarity, or graphic similarity associated with one or more documents to be released may be used to infer authorization for the one or more documents (e.g., it may be inferred that a person's reaction to authorization requests for similar documents may be the same). In one example, a requesting third party may be associated with a health care organization and a first set of medical records requested may be semantically similar and/or graphically similar to a second set of medical records for which authorization has already been granted to the requesting third party. In this case, authorization to the first set of medical records may be given to the requesting third party based on a degree of semantic similarity and/or graphical similarity between the first set of medical records and the second set of medical records.

Figure 5B:
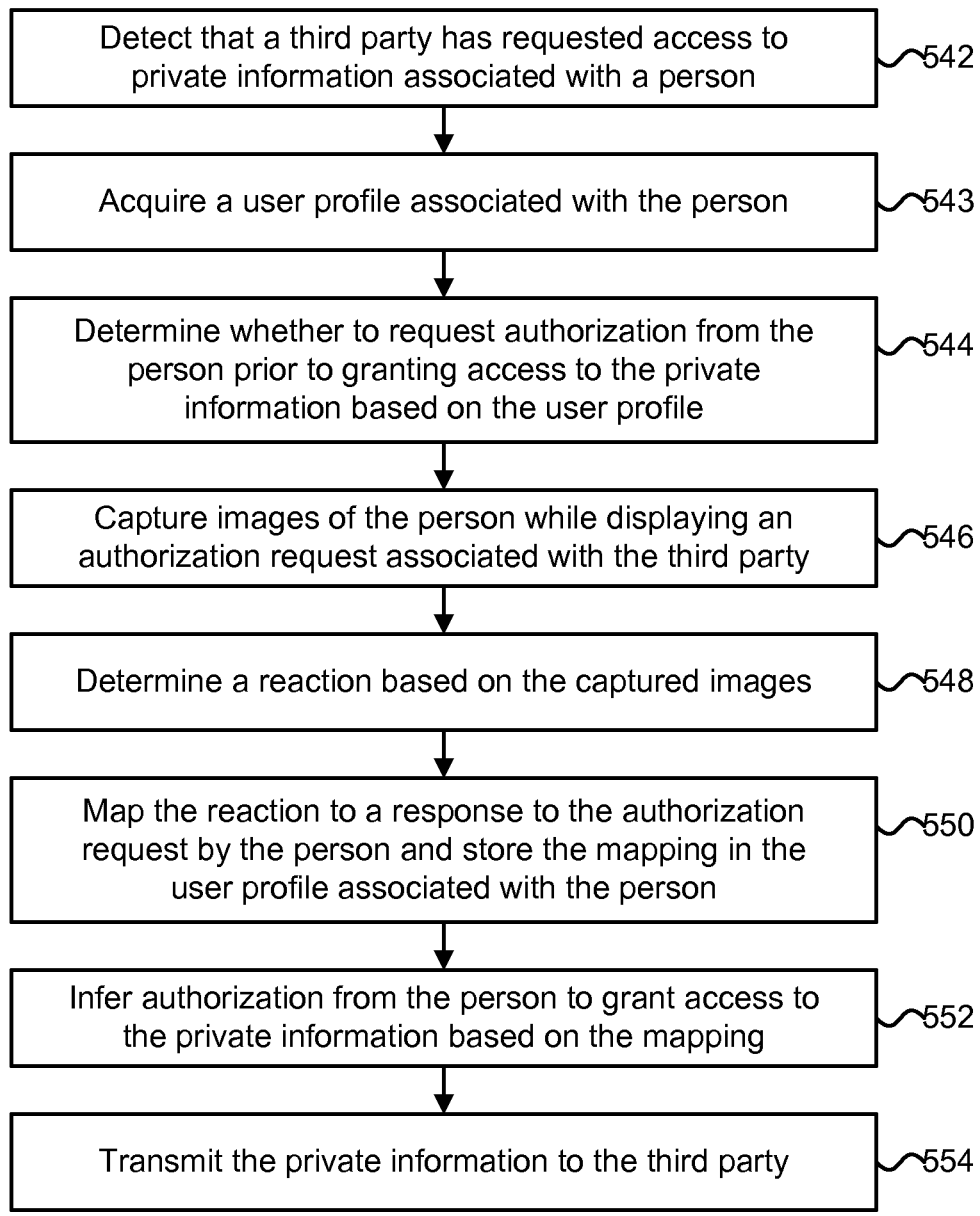
FIG. 5B is a flowchart describing one embodiment of a process for preventing the transmission of private information.

FIG. 5B is a flowchart describing one embodiment of a process for preventing the transmission of private information. In one embodiment, the process of FIG. 5B is performed by a mobile device, such as mobile device 140 in FIG. 1.

In step 542, it is detected that a third party has requested access to private information associated with a person. The third party may request access to a document including the private information stored on a website. In one example, a web server associated with a website may detect that the third party is requesting access to the private information stored on the website. In step 543, a user profile associated with the person is acquired. In step 544, it is determined whether to request authorization from the person prior to granting access to the private information based on the user profile. In one embodiment, authorization to the private information may be required if a classification for the private information explicitly requires authorization or if a user profile associated with the person does not include a mapping for the private information to the third party.

In step 546, images of the person are captured while displaying an authorization request for the private information associated with the third party. The images may be captured using a front-facing camera associated with a computing device used to display the authorization request to the end user. In step 548, a reaction is determined based on the captured images. The reaction may be determined based on facial expressions and/or gestures performed by the end user while the end user reads the authorization request. The reaction may be deemed to correspond with an inferred approval if the person accepts the authorization request and displays facial expressions that correspond with a neutral or happy emotional state. The reaction may be deemed to correspond with an inferred disapproval if the person rejects the authorization or if the person accepts the authorization request but displays facial expressions that correspond with an angry or frustrated emotional state.

In step 550, the reaction is mapped to a response to the authorization request by the person and stored in the user profile associated with the person. For example, the user profile may include a mapping of an end user's reaction to an authorization request associated with their financial records. The mapping may be stored on a per requestor basis (e.g., the mapping may be specific to the third party requesting the private information).

In step 552, authorization from the person to grant access to the private information is inferred based on the mapping. One embodiment of a process for inferring authorization is described later in reference to FIG. 5C. In step 554, the private information is transmitted to the third party in response to inferring authorization from the person. In one example, the private information associated with a person may comprise their private phone number and a request for a webpage including the private information may be made by the third party to a website. A server of the website may store a user profile associated with the person and infer authorization to provide access to the webpage including the person's private phone number based on mappings associated with the person's private phone number stored in the user profile.

Figure 5C:
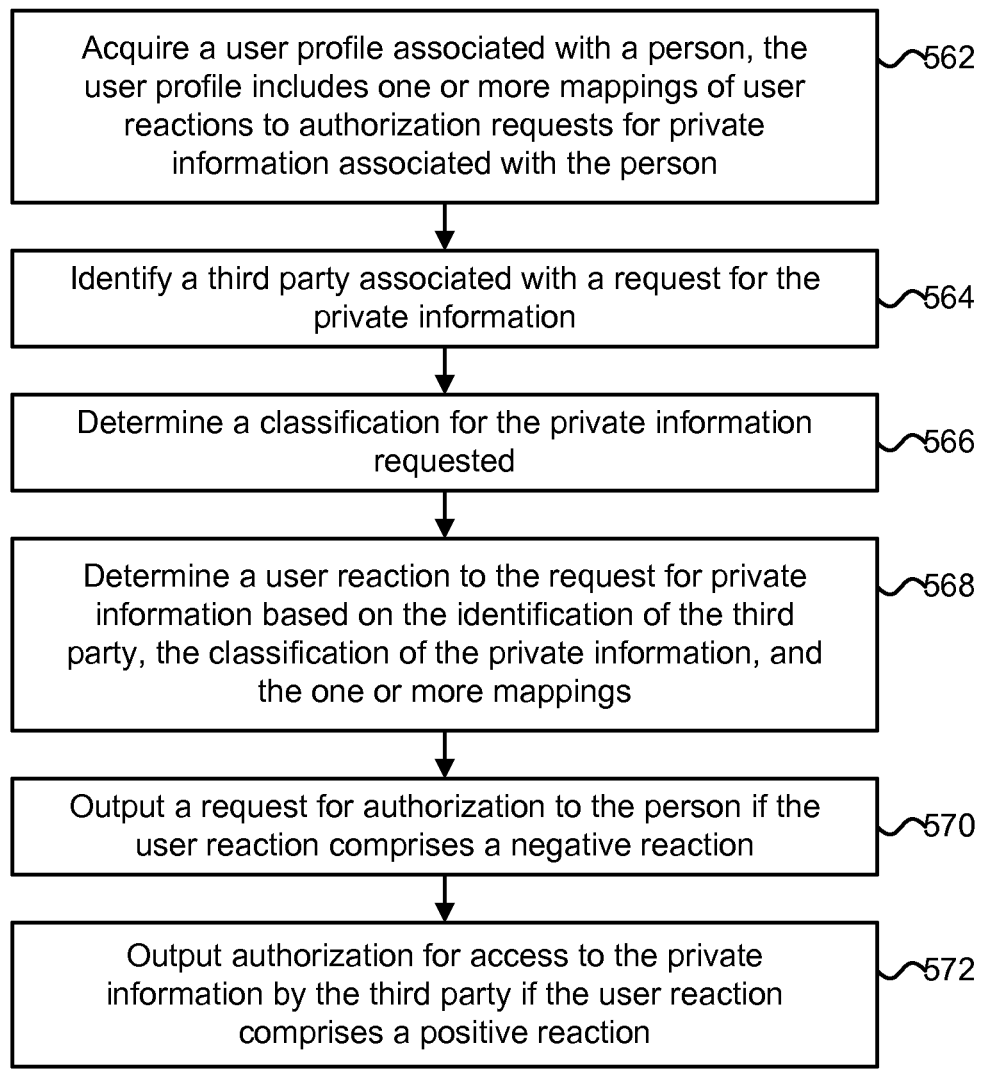
FIG. 5C is a flowchart describing one embodiment of a process for inferring authorization to private information.

FIG. 5C is a flowchart describing one embodiment of a process for inferring authorization to private information. The process described in FIG. 5C is one example of a process for implementing step 518 in FIG. 5A or for implementing step 552 in FIG. 5B. In one embodiment, the process of FIG. 5C is performed by a mobile device, such as mobile device 140 in FIG. 1.

In step 562, a user profile associated with a person is acquired. The user profile may include one or more mappings of user reactions to an authorization request for private information associated with the person. In step 564, a third party associated with a request for the private information is identified. The third party may be identified by a name of the third party or an email address associated with the third party. The third party may also be identified as belonging to a particular group or organization (e.g., employed by a particular company).

In step 566, a classification for the private information requested is determined. The private information may comprise information associated with the person that is not publicly available such as the person's Social Security number, private home address, or medical records. In one embodiment, private information may be classified as always requiring authorization before transmission, never requiring authorization before transmission, or authorization may be inferred based on the person's authorization history.

In step 568, a user reaction to the request for private information is determined (or inferred) based on the identification of the third party, the classification of the private information, and the one or more mappings. In one example, a first mapping of the one or more mappings may correspond with a positive reaction to requests to the person's private home address by a third party identified by a particular email address.

In step 570, a request for authorization is outputted to the person if the user reaction determined in step 568 comprises a negative reaction. The negative reaction may correspond with facial expressions and/or gestures performed by the person associated with an angry or frustrated emotional state. In this case, access to the private information may only be provided to the third party if the person explicitly authorizes access to the private information. In step 572, authorization for access to the private information by the third party is outputted if the user reaction determined in step 568 comprises a positive reaction. The positive reaction may correspond with facial expressions and/or gestures performed by the person associated with a neutral or happy emotional state.

Figure 6A:
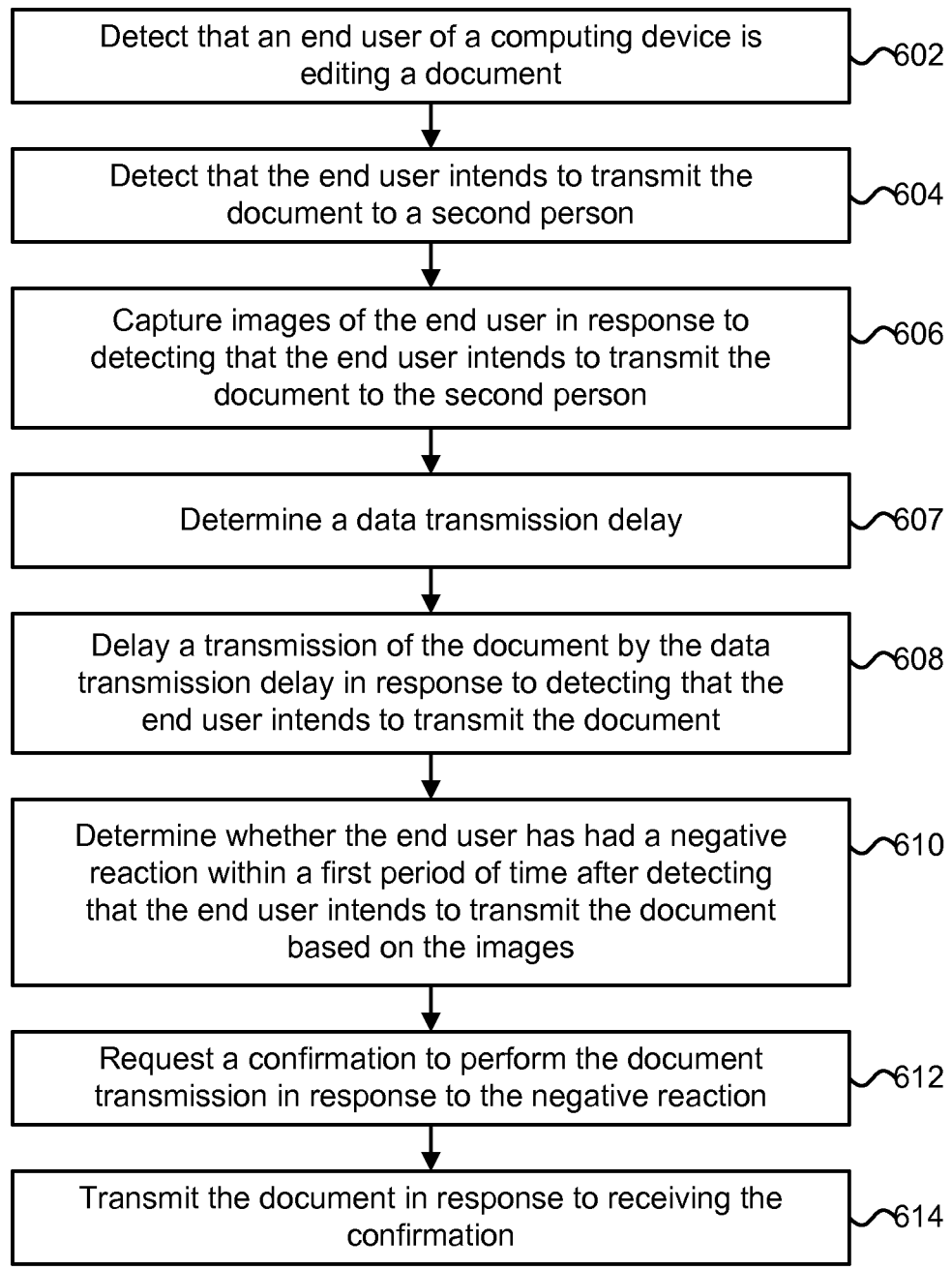
FIG. 6A is a flowchart describing one embodiment of a process for preventing the transmission of sensitive information.

FIG. 6A is a flowchart describing one embodiment of a process for preventing the transmission of sensitive information. In one embodiment, the process of FIG. 6A is performed by a mobile device, such as mobile device 140 in FIG. 1. The process of FIG. 6A may also be performed by a server, such as server 160 in FIG. 1.

In step 602, it is detected that an end user of a computing device is editing a document (or other electronic file) using the computing device. The document may be stored locally on the computing device or remotely on a remote file server. The document may detected as edited by the end user if a document state of the document corresponds with a modified state and the end user has provided input to the computing device to change the document state. The document may comprise an email message, word processing document, spreadsheet, or other electronic file. The end user may edit the document by modifying the document, adding text or symbols to the document, or deleting text or symbols from the document.

In step 604, it is detected that the end user intends to transmit the document to a second person. It may be detected that the end user intends to transmit the document to the second person if an email address associated with the second person is one of the target email addresses used by the end user to transmit the document to an intended recipient. In one embodiment, it may be determined that the end user intends to transmit the document when the end user has initiated a data transfer including the document. In one embodiment, it may be determined that the end user intends to transmit the document if the end user attempts to send an email message including the document (e.g., the end user selects an email send button within an email application). In another embodiment, it may be determined that the end user intends to transmit the document if the end user attempts to initiate an electronic document transfer (e.g., using FTP).

The second person may be associated with a target email address (i.e., an email address of an intended recipient of the document). In one embodiment, it may be detected that the end user intends to transmit the document to a second person if the target email address associated with the second person is different from one or more email addresses associated with the end user. In one example, the end user may be associated with a work email address and a personal email address. If the target email address is different from the work email address and the personal email address, then it may be determined that the end user intends to transmit the document to a different person. In some cases, the determination of whether the end user accidentally initiated a document transfer or expresses an unintended transmission of the document after initiating the document transfer may only be performed if the target email address is different from one or more email addresses associated with the end user (i.e., documents that are transmitted to yourself won't be analyzed).

In step 606, images of the end user are captured in response to detecting that the end user intends to transmit the document to the second person. The images may be captured using a camera, such as front-facing camera 253 in FIG. 2A. In some embodiments, video and/or audio associated with the end user may be captured upon detection that the end user intends to transmit the document to another person.

In step 607, a data transmission delay is determined. In one embodiment, the data transmission delay may be set using contextual information such as a time of day, a day of the week, a mood of an organization of which the end user is a member, and/or a mood of the end user. The mood of the end user may correspond with an individual mood classification associated with the end user. In some cases, the data transmission delay may comprise a baseline delay value (e.g., one minute) that may be adjusted based on the contextual information (e.g., if the mood of the end user is angry or frustrated, then an additional five minute delay may be added to the baseline delay value).

In step 608, a transmission of the document is delayed by the data transmission delay in response to detecting that the end user intends to transmit the document. In one embodiment, the document may be placed into a buffer (e.g., located on a mail server) and withheld from transmission until the data transmission delay has passed.

In step 610, it is determined whether the end user has had a negative reaction within a first period of time after detecting that the end user intends to transmit the document based on the images. The first period of time may correspond with the data transmission delay. For example, if the data transmission delay comprises a six minute delay, then the first period of time may be set to the six minute delay. In one embodiment, the negative reaction may correspond with facial expressions and/or gestures performed by the end user associated with an angry or frustrated emotional state. The negative reaction may be determined by applying facial expression and mood detection techniques to the captured images.

In another embodiment, the negative reaction may correspond with facial expressions and/or gestures performed by the end user associated with a surprised emotional state. For example, if the end user performs facial expressions such as holding an open mouth with raised eye brows for more than a threshold period of time (e.g., five seconds) or performs gestures such as covering their mouth with their hands for more than the threshold period of time, then the end user may be deemed to be in a surprised or panicked emotional state. In some embodiments, audio may be captured along with the images and analyzed for particular words such as "oh no" or "darn it" in order to detect a surprised or panicked emotional state.

In step 612, a confirmation to perform the document transmission is requested in response to the negative reaction. In one embodiment, a confirmation request may be sent to the end user and confirmation from the end user may be required before performing the document transmission (or other data transmission including the document). In some cases, the end user may confirm the intended transmission of the document by performing a particular gesture (e.g., a thumbs up) or speaking a particular phrase (e.g., "I confirm"). In step 614, the document is transmitted in response to receiving the confirmation. The document may be transmitted to an email address associated with the second person. In the event that the end user does not provide the confirmation necessary to transmit the document, the document transmission may be canceled or terminated.

Figure 6B:
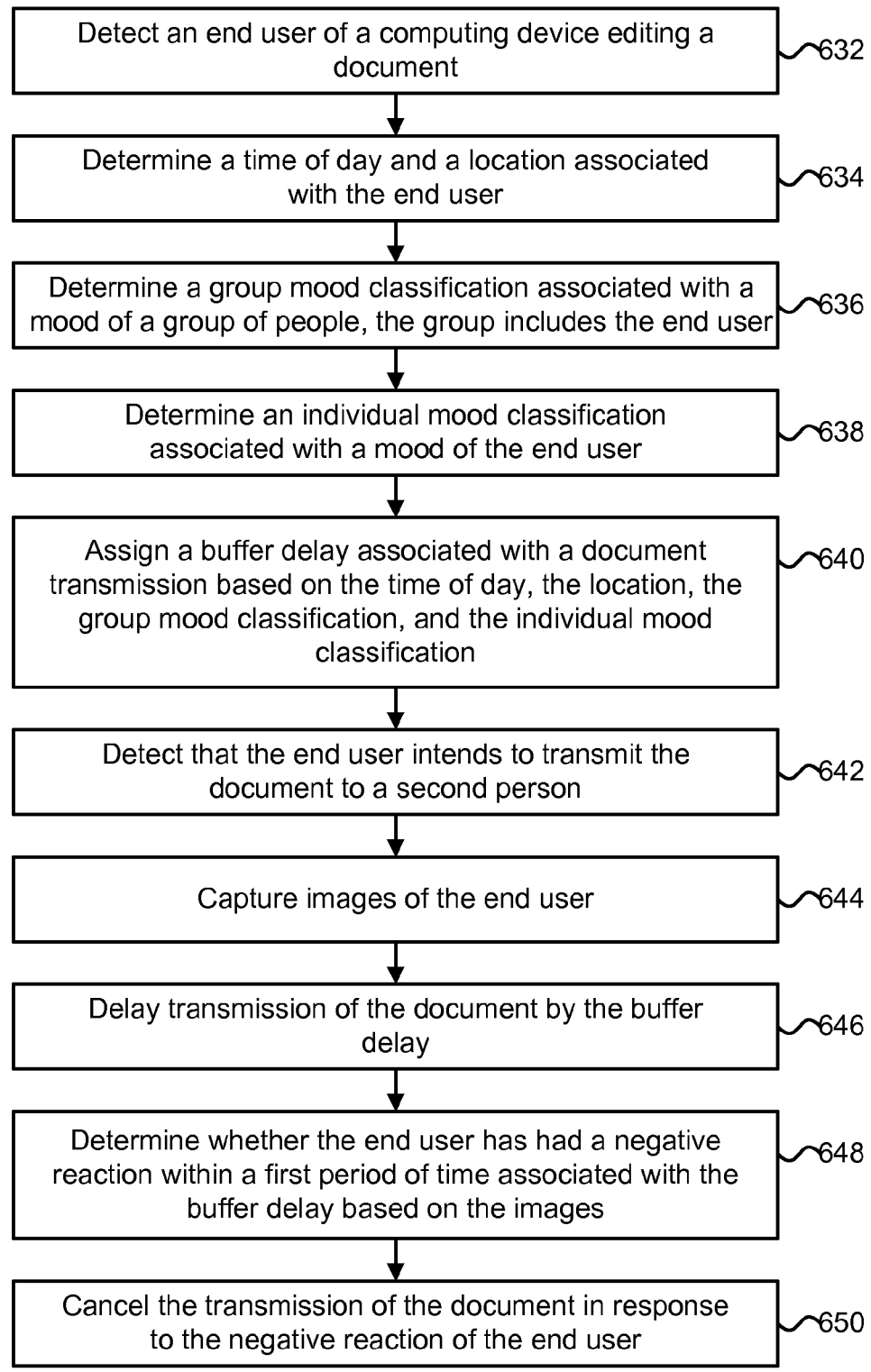
FIG. 6B is a flowchart describing one embodiment of a process for preventing the transmission of sensitive information.

FIG. 6B is a flowchart describing one embodiment of a process for preventing the transmission of sensitive information. In one embodiment, the process of FIG. 6B is performed by a mobile device, such as mobile device 140 in FIG. 1. The process of FIG. 6B may also be performed by a server, such as server 160 in FIG. 1.

In step 632, it is detected that an end user of a computing device is editing a document. The document may be stored locally on the computing device or remotely on a remote file server (e.g., the document may be controlled by the end user using the computing device even though the document is stored on a remote server). The document may be detected as being edited by the end user if a document state of the document corresponds with a modified state and the end user has provided input to the computing device to change the document state. The document may comprise an email message, word processing document, spreadsheet, or other electronic file. The end user may edit the document by modifying the document, adding text or symbols to the document, or deleting text or symbols from the document.

In step 634, a time of day and a location associated with the end user are determined. The location of the end user may correspond with a GPS location of the computing device. In step 636, a group mood classification associated with a mood of a group of people is determined. The group of people may include the end user. One embodiment of a process for determining a group mood classification is described later in reference to FIG. 6C.

In step 638, an individual mood classification associated with a mood of the end user is determined. The mood of the end user may be determined over a period of time (e.g., within a four hour period or over a 24-hour period). The individual mood classification may be determined by applying facial expression and mood detection techniques to captured images of the end user over the period of time. The individual mood classification may classify a mood of the end user as angry, frustrated, sad, anxious, neutral, or happy. One embodiment of a process for determining an individual mood classification was described earlier in reference to FIG. 3C.

In some cases, the individual mood classification may be determined based on baseline mood characteristics associated with typical end user facial expressions that occur during different times of the day and/or when the end user is working in different locations (e.g., the number of times that the end user typically makes a sad face or displays anger may be lower at night at home than during the day at work). Other baseline behaviors associated with the end user such as typical degrees of hand shaking during different times of the day or when in different locations may be taken into account when determining the individual mood classification.

In step 640, a buffer delay associated with a document transmission is assigned based on the time of day, the location of the end user, the group mood classification, and the individual mood classification. In some cases, the buffer delay may be increased when the end user is away from a work environment (e.g., at home) or when the end user is editing the document during a time that the end user is not typically working (e.g., deviates from baseline working hours). In step 642, it is detected that the end user intends to transmit the document to a second person. It may be detected that the end user intends to transmit the document to the second person if an email address associated with the second person is one of the target email addresses used by the end user to transmit the document to an intended recipient. In one embodiment, it may be determined that the end user intends to transmit the document when the end user has initiated a data transfer including the document. In one embodiment, it may be determined that the end user intends to transmit the document if the end user attempts to send an email message including the document (i.e., the end user hits a send button within an email application).

In step 644, images of the end user are captured. The images of the end user may be captured in response to detecting that the end user intends to transmit the document to the second person. The images may be captured using a camera, such as front-facing camera 253 in FIG. 2A. In some embodiments, video and/or audio associated with the end user may be captured upon detection that the end user intends to transmit the document to another person.

In step 646, transmission of the document is delayed by the buffer delay. In some cases, the buffer delay may be adjusted based on contextual information (e.g., if the mood of the end user is angry or frustrated, then an additional five minute delay may be added to a baseline buffer delay value).

In step 648, it is determined whether the end user has had a negative reaction within a first period of time associated with the buffer delay based on the images. In one embodiment, the negative reaction may correspond with facial expressions and/or gestures performed by the end user associated with an angry or frustrated emotional state. The negative reaction may be determined by applying facial expression and mood detection techniques to the captured images. In another embodiment, the negative reaction may correspond with facial expressions and/or gestures performed by the end user associated with a surprised emotional state. For example, if the end user may performs facial expressions such as holding an open mouth with raised eye brows for more than a threshold period of time (e.g., five seconds) or gestures such as covering their mouth with their hands for more than the threshold period of time, then the end user may be deemed to be in a surprised or panicked emotional state. In some embodiments, audio may be captured along with the images and analyzed for particular words such as "oh no" or "darn it" in order to detect a surprised or panicked emotional state. In step 650, the transmission of the document is canceled in response to the negative reaction of the end user.

Figure 6C:
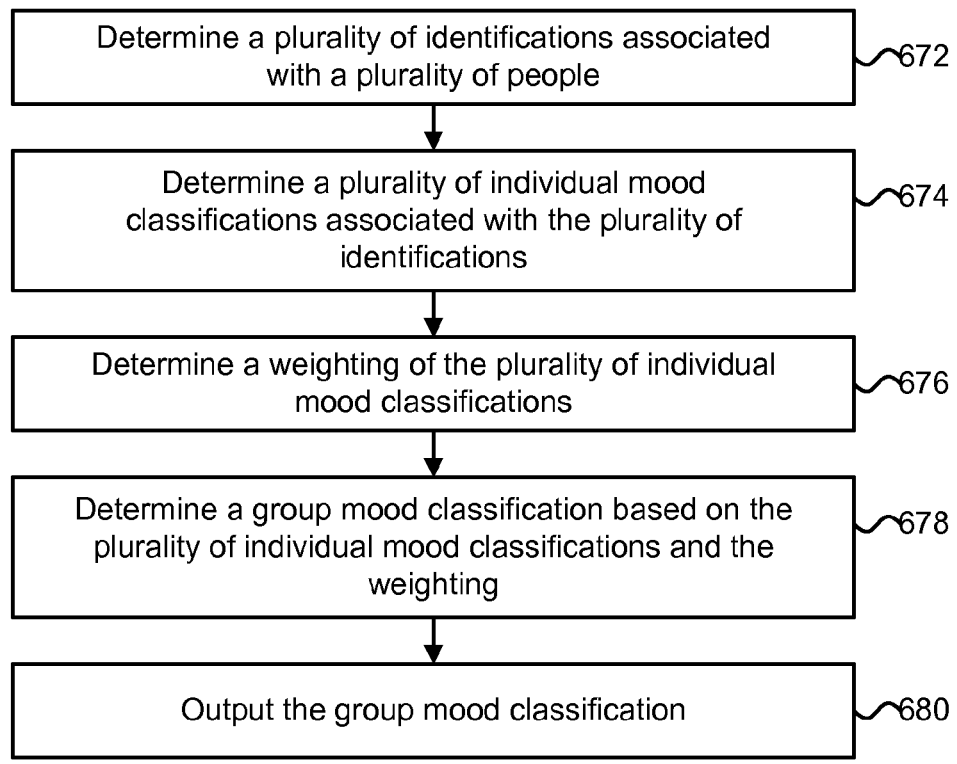
FIG. 6C is a flowchart describing one embodiment of a process for determining a group mood classification.

FIG. 6C is a flowchart describing one embodiment of a process for determining a group mood classification. The process described in FIG. 6C is one example of a process for implementing step 636 in FIG. 6B. In one embodiment, the process of FIG. 6C is performed by a mobile device, such as mobile device 140 in FIG. 1.

In step 672, a plurality of identifications associated with a plurality of people is determined. The plurality of people may be associated with an organization, a company, or a team of people working on a common project. The plurality of identifications may comprise names or identification numbers (e.g., employee identification numbers) associated with the plurality of people. In step 674, a plurality of individual mood classifications associated with the plurality of identifications is determined. In one embodiment, the plurality of individual mood classifications may be acquired from an aggregation server that aggregates individual mood classifications computed by various computing devices used by the plurality of people. One embodiment of a process for determining an individual mood classification was described earlier in reference to FIG. 3C.

In step 676, a weighting of the plurality of individual mood classifications is determined. The weighting may depend on contextual organizational information such as whether stressful events have occurred to an organization such as a recent reduction in force, buyout rumors, recent employee layoffs, recent reporting of poor financial results, or recent changes in the value of company stock. In step 678, a group mood classification is determined based on the plurality of individual mood classifications and the weighting determined in step 676. In one embodiment, the group mood classification associated with a first time period may correspond with the most frequent individual mood classification of the plurality of individual mood classifications over the first time period. For example, if each of the plurality of individual mood classifications is assigned to one of ten different mood classifications, then the group mood classification may be assigned to the most frequent classification of the ten different mood classifications. In step 680, the group mood classification is outputted.

Figure 7A:
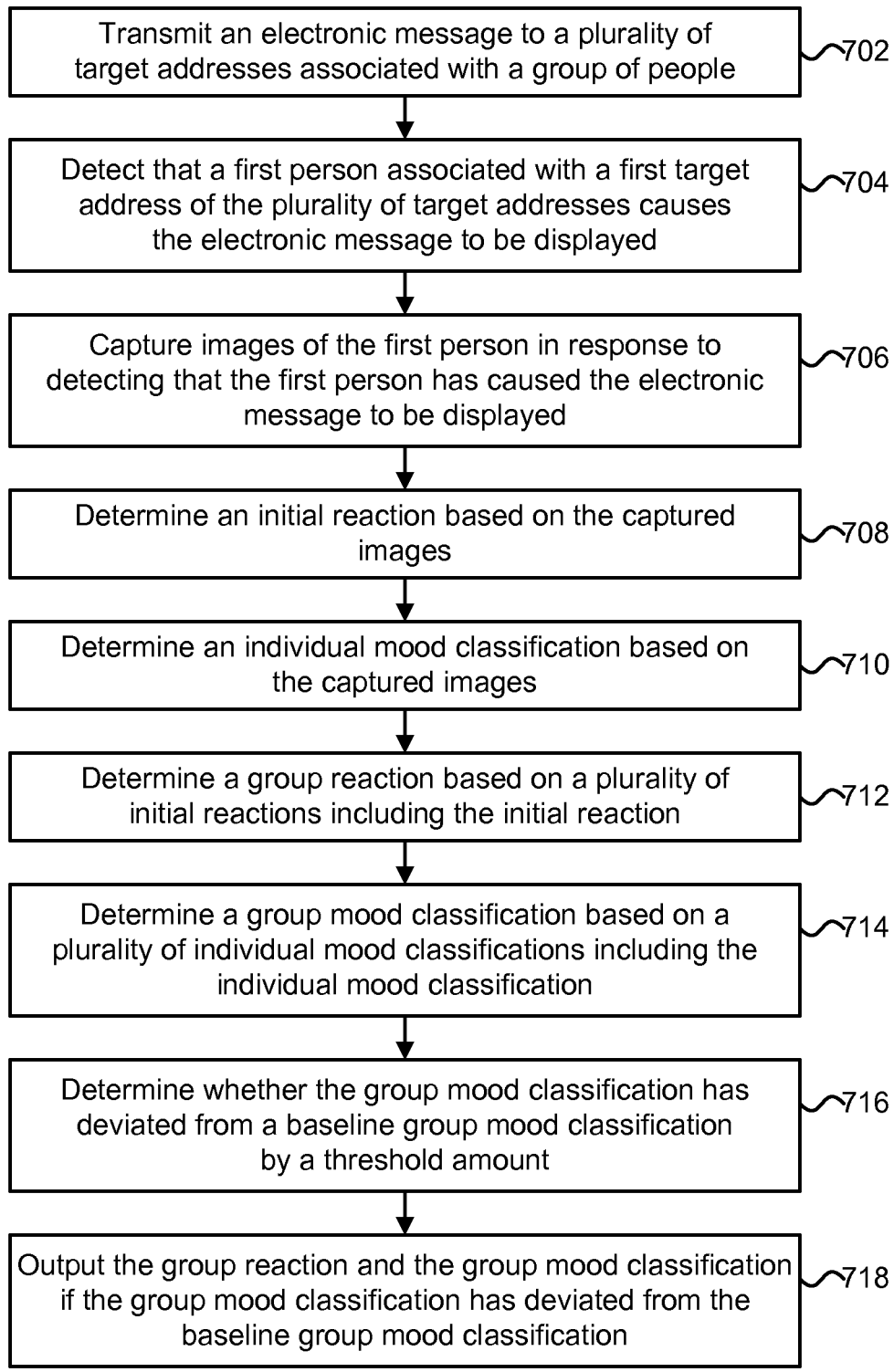
FIG. 7A is a flowchart describing one embodiment of a process for determining a mood of an organization and for detecting shifts in the mood of the organization.

FIG. 7A is a flowchart describing one embodiment of a process for determining a mood of an organization and for detecting shifts in the mood of the organization. In one embodiment, the process of FIG. 7A is performed by a server, such as server 160 in FIG. 1.

In step 702, an electronic message is transmitted to a plurality of target addresses associated with the group of people. The group of people may be associated with an organization, a company, or a team of people working on a common project. The target addresses may comprise a plurality of target email addresses. The electronic message may include a message from a human resources department (e.g., informing employees of a change in benefits) or a message from an executive of a company (e.g., discussing news regarding the company). The electronic message may be transmitted simultaneously to each of the plurality of target addresses. The electronic message may comprise an email message.

In step 704, it is detected that a first person associated with a first target address of the plurality of target addresses caused the electronic message to be displayed. In one embodiment, the first person may cause the electronic message to be displayed by selecting the electronic message within an email application. As the electronic message may be transmitted to many different people, each person may open or read the electronic message at different times (i.e., the reading of the electronic message may be an asynchronous event).

In step 706, images of the first person are captured in response to detecting that the first person has caused the electronic message to be displayed. The images may be captured using a front-facing camera associated with a computing device displaying the electronic message. The images may be captured in response to detecting that the first person is reading the electronic message. In one embodiment, eye tracking techniques may be used to determine if the end user is reading the electronic message. For example, the end user may be deemed to be reading the electronic message if they are looking at a display displaying the electronic message and their eye movements correspond with a tracking of words in the electronic message.

In step 708, an initial reaction is determined based on the captured images. The initial reaction may be determined by applying facial expression and mood detection techniques to the captured images. In one example, the initial reaction may correspond with a surprised reaction or an angry reaction.

In step 710, an individual mood classification is determined based on the captured images. Facial expression and mood detection techniques may be used to determine a mood classification for an individual or a group of individuals. The facial expression and mood detection techniques may identify facial descriptors and facial landmarks from the captured images. The facial descriptor may comprise information regarding select facial features of the first person (e.g., the relative position of the person's eyes, nose, cheekbones, and/or jaw). The select facial features may be extracted or detected within the captured images by applying various image processing techniques such as object recognition, feature detection, corner detection, blob detection, and edge detection methods to the captured images.

The individual mood classification of the end user may be determined over a period of time (e.g., within a four hour period or over a 24-hour period). The individual mood classification may be determined by applying facial expression and mood detection techniques to captured images of the end user over the period of time. The individual mood classification may classify a mood of the end user as angry, frustrated, sad, anxious, neutral, or happy using a numerical value.

In some cases, the individual mood classification may be determined based on baseline mood characteristics associated with typical end user facial expressions that occur during different times of the day and/or when the end user is working in different locations (e.g., the number of times that the end user typically makes a sad face or displays anger may be lower at night at home than during the day at work). Other baseline behaviors associated with the end user such as typical degrees of hand shaking during different times of the day or when in different locations may be taken into account when determining the individual mood classification. The location of the end user may be determined by acquiring GPS location information associated with a mobile device used by the end user (e.g., the end user's cell phone). In some cases, other baseline indicators of mood, such as a pulse rate or respiration rate associated with the end user, may also be used for determining an individual mood classification.

In step 712, a group reaction is determined based on a plurality of initial reactions including the initial reaction of the first person. In one embodiment, the group reaction may correspond with the most frequent reaction of the plurality of reactions. In some cases, the classifications used for individual moods may also be used for individual reactions. An individual reaction classification may be determined using a shorter period of time than an individual mood classification. For example, an individual reaction classification may correspond with a first period of time (e.g., 30 seconds) and an individual mood classification may correspond with a second period of time (e.g., 24 hours).

In step 714, a group mood classification is determined based on a plurality of individual mood classifications including the individual mood classification associated with the first person. In one embodiment, the group mood classification may correspond with a most frequent classification of a plurality of individual mood classifications associated with the group of people. One embodiment of a process for determining a group mood classification was described previously in reference to FIG. 6C.

In step 716, it is determined whether the group mood classification has deviated from a baseline group mood classification by a threshold amount (or a threshold value). In one example, a mood classification spectrum (or order of classifications) may be created. For example, at a low end of the classification spectrum may be anger and sadness, in the middle of the classification spectrum may be neutral, and at a high end of the classification spectrum may be happiness. A numerical range may be assigned to the mood classification spectrum and if a deviation from a particular numerical value is identified, then a deviation may be triggered.

In one embodiment, the mood classification spectrum may correspond with a numerical range from 1 to 100 with a 50 being assigned to a neutral mood classification and 100 being assigned to the happiest emotional state. Assuming a threshold value of 15, if a baseline group mood classification is set to a value of 70 and the group mood classification is determined to be 50, then a deviation may be detected as the threshold value has been exceeded. The deviation may be a positive deviation (i.e., a shift towards happiness) or a negative deviation (i.e., a shift towards anger).

In step 718, the group reaction and the group mood classification is outputted if the group mood classification has deviated from the baseline group mood classification by more than a threshold value. In some cases, the group reaction may be transmitted (e.g., as part of an email alert) to human resources personnel or a manager of an organization if the group mood classification has deviated from the baseline group mood classification by more than a threshold value and the deviation is a negative deviation.

Figure 7B:
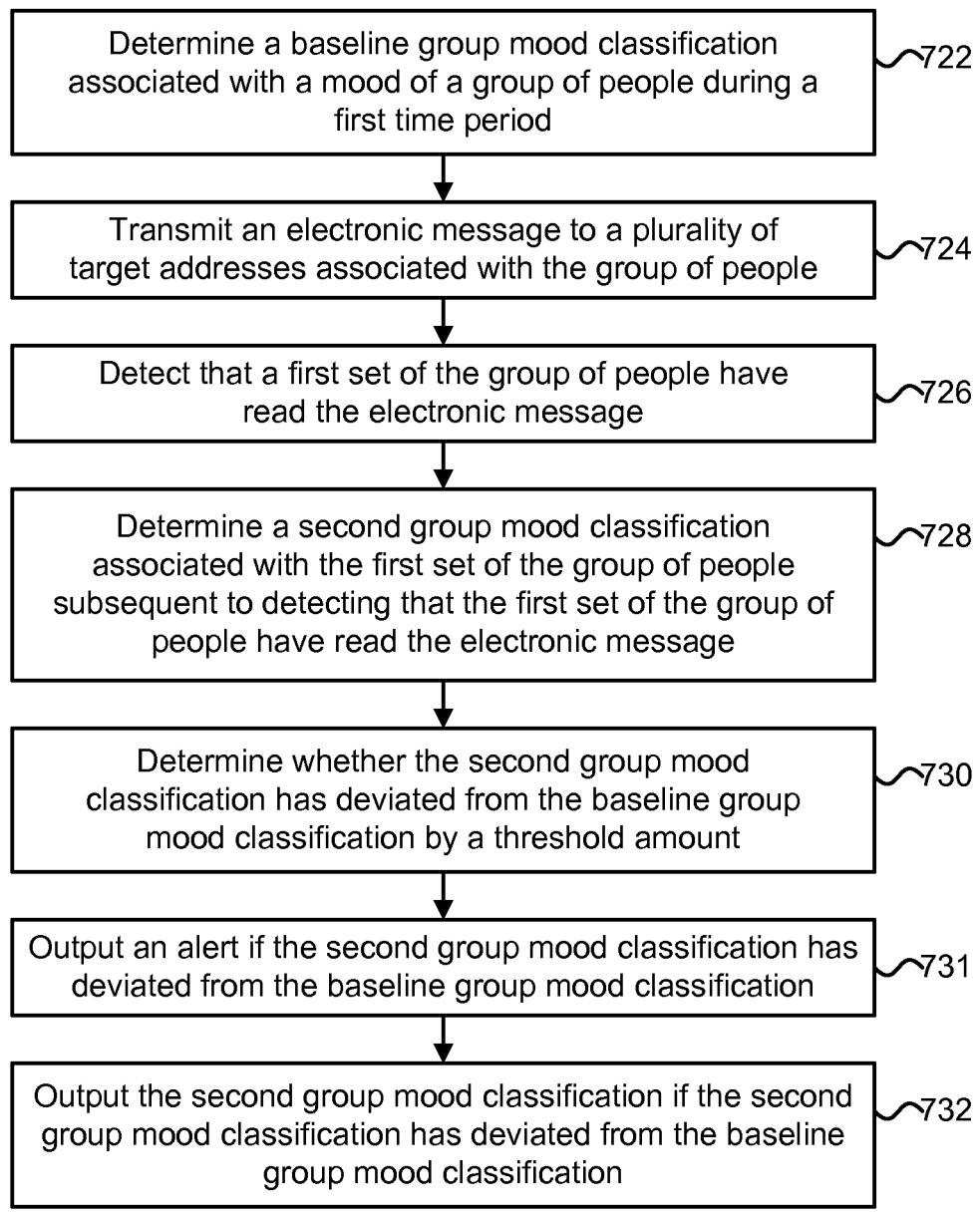
FIG. 7B is a flowchart describing one embodiment of a process for detecting a group response to an electronic message.

FIG. 7B is a flowchart describing one embodiment of a process for detecting a group response to an electronic message. In one embodiment, the process of FIG. 7B is performed by a server, such as server 160 in FIG. 1.

In step 722, a baseline group mood classification associated with a mood of a group of people during a first time period is determined. In some cases, the first time period may comprise a six-month period or a three-month period. In step 724, an electronic message is transmitted to a plurality of target addresses associated with the group of people. The electronic message may comprise an email message. The electronic message may include a message from a human resources department (e.g., informing employees of a change in benefits) or a message from an executive of a company (e.g., a resignation letter that has not been vetted by human resources personnel).

In step 726, it is detected that a first set of the group of people have read the electronic message. The first set may comprise the first 10 people of the group of people to read the electronic message. In some cases, the first set of the group of people may comprise a predefined group of people (e.g., defined by human resources personnel) who are transmitted electronic messages before they are broadcast to the rest of the group of people.

In step 728, a second group mood classification associated with the first set of the group of people is determined subsequent to detecting that the first set of the group of people have read the electronic message. In one embodiment, eye tracking techniques may be used to determine if the first set of the group of people have read the electronic message. For example, the each person of the first set may be deemed to have read the electronic message if they looked at a display displaying the electronic message and their eye movements correspond with a tracking of words in the electronic message. In some embodiments, the second group mood classification may correspond with a most frequent classification of a plurality of individual mood classifications associated with the first set. One embodiment of a process for determining a group mood classification was described previously in reference to FIG. 6C.

In step 730, it is determined whether the second group mood classification has deviated from the baseline group mood classification by more than a threshold amount. In one embodiment, a mood classification spectrum may be created along a numerical range (e.g., from 1 to 100). In one example, at a low end of the classification spectrum may be anger and sadness, in the middle of the classification spectrum may be neutral, and at a high end of the classification spectrum may be happiness. A deviation from the baseline group mood classification may be identified if the second group mood classification deviates from the baseline group mood classification by more than a threshold value associated with the threshold amount (e.g., more than 15%). For example, given a threshold value of 15, if a baseline group mood classification is set to a value of 50 and the second group mood classification is determined to be 30, then a deviation may be detected as the threshold value has been exceeded. The deviation may be a positive deviation (i.e., a shift towards happiness) or a negative deviation (i.e., a shift towards anger).

In step 731, an alert is outputted if the second group mood classification has deviated from the baseline group mood classification. In step 732, the second group mood classification is outputted if the second group mood classification has deviated from the baseline group mood classification. In some cases, the alert may be transmitted to human resources personnel or a manager of an organization if the deviation is a negative deviation. In some cases, the alert may comprise an email message, instant message, tweet, or other electronic notification. The electronic notification (or electronic message) may be sent to an automated response system or an email address (e.g., an email address associated with human resources personnel).

Figure 7C:
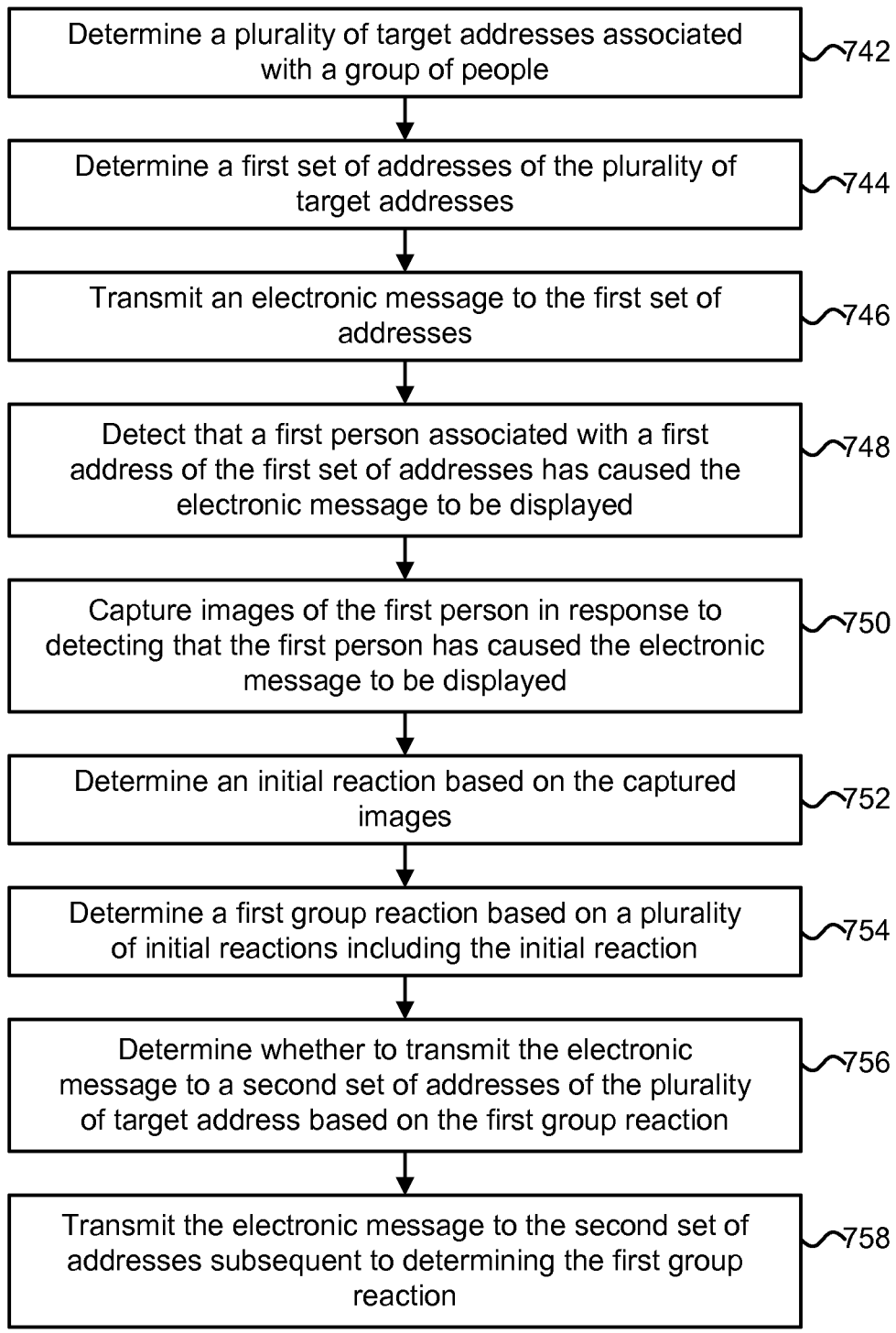
FIG. 7C is a flowchart describing one embodiment of a process for transmitting an electronic message based on reactions of a group of people.

FIG. 7C is a flowchart describing one embodiment of a process for transmitting an electronic message based on reactions of a group of people. In one embodiment, the process of FIG. 7C is performed by a server, such as server 160 in FIG. 1. The server may comprise an email server.

In step 742, a plurality of target addresses associated with a group of people is determined. The plurality of target addresses may correspond with a plurality of email addresses associated with a group of people in a company or other organization. In step 744, a first set of addresses of the plurality of target addresses is determined. The first set of addresses may correspond with a predefined group of people (e.g., defined by human resources personnel) who are transmitted electronic messages before they are broadcast to other people.

In step 746, electronic message is transmitted to the first set of addresses. The electronic message may be transmitted to the first set of addresses via email or text messaging. In one embodiment, the electronic message may comprise an email message. In step 748, it is detected that a first person associated with a first address of the first set of addresses has caused electronic message to be displayed. In one embodiment, the first person may cause the electronic message to be displayed by selecting the electronic message within an email application. In another embodiment, the first person may cause the electronic message to be displayed by selecting the electronic message within an electronic message viewing application (e.g., as a feature of a social networking website).

In step 750, images of the first person are captured in response to detecting that the first person has caused electronic message to be displayed. The images may be captured using a front-facing camera associated with a computing device displaying the electronic message. The images may be captured in response to detecting that the first person is reading (or has started reading) the electronic message. In one embodiment, eye tracking techniques may be used to determine if the first person is reading or has started reading the electronic message. For example, the first person may be deemed to be reading the electronic message if they are looking at a display displaying the electronic message and their eye movements correspond with a tracking of words in the electronic message.

In step 752, an initial reaction is determined based on the captured images. The initial reaction may be determined by applying facial expression and mood detection techniques to the captured images. In one example, the initial reaction may correspond with a surprised reaction or an angry reaction. In step 754, a first group reaction is determined based on a plurality of initial reactions including the initial reaction of the first person. The plurality of initial reactions may correspond with a plurality of different people associated with the first set of addresses.

In step 756, it is determined whether to transmit the electronic message to a second set of addresses of the plurality of target addresses based on the first group reaction. The electronic message may be transmitted to the second set of addresses if the first group reaction comprises a positive reaction or a non-negative reaction. The first set of addresses may comprise a first subset of the plurality of target addresses and the second set of addresses may comprise the remainder of the plurality of target addresses. The second set of addresses may be different from the first set of addresses (i.e., correspond with two different groups of people). In one embodiment, if the first group reaction comprises a negative reaction, then the electronic message may not be transmitted to the second set of addresses and an alert may be issued to human resources personnel that the first group reaction comprised a negative reaction. In step 758, the electronic message is transmitted to the second set of addresses subsequent to determining the first group reaction.

Figure 8:
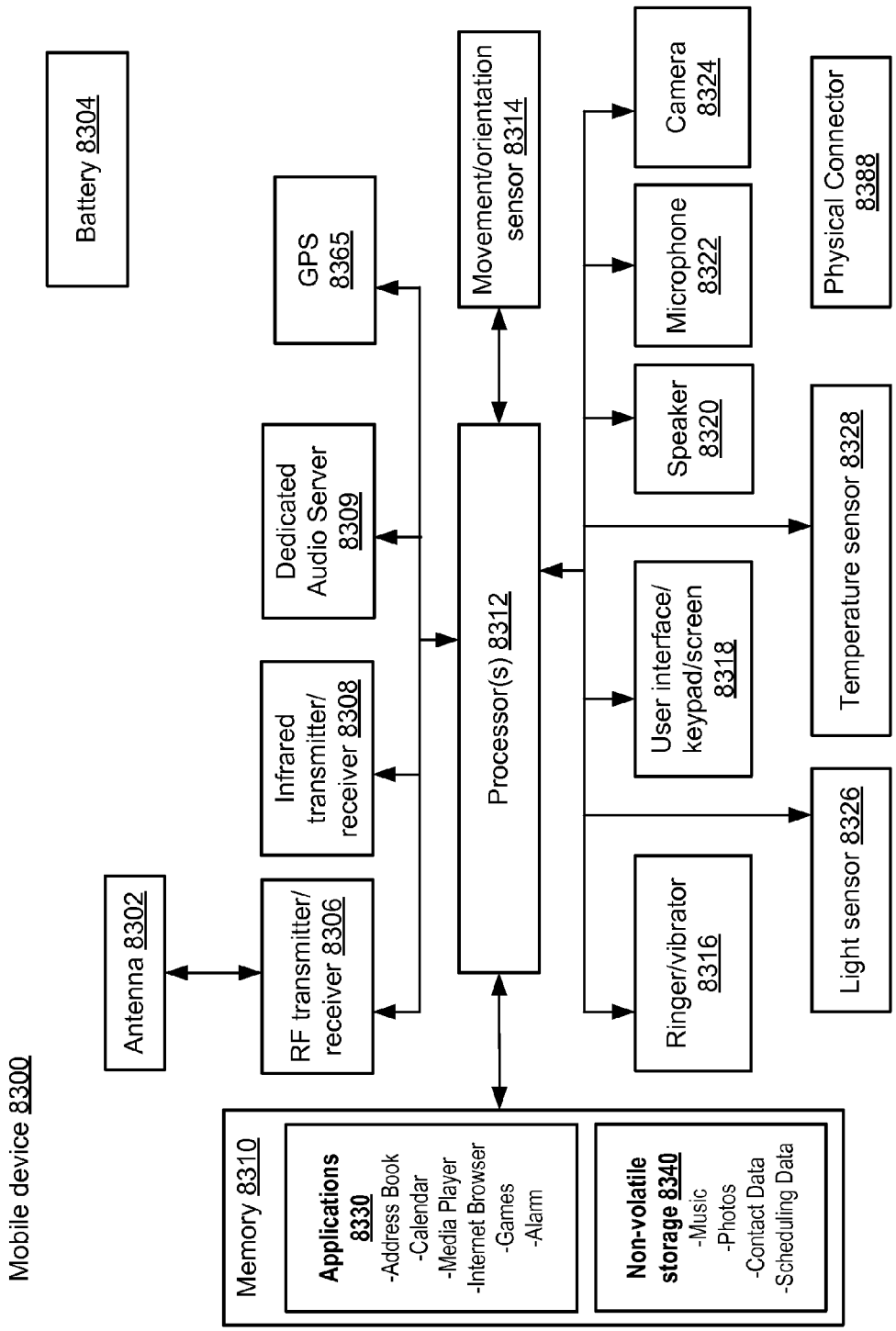
FIG. 8 depicts one embodiment of a mobile device.

The disclosed technology may be used with various computing systems. FIG. 8 depicts one embodiment of a mobile device 8300, which includes one example of a mobile implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a microelectromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for preventing transmission of sensitive information, comprising:
   detecting that an end user of a computing device intends to transmit an electronic file to a second person;
   capturing images of the end user in response to detecting that the end user intends to transmit the electronic file;
   determining a data transmission delay;
   in response to detecting that the end user intends to transmit the electronic file to the second person, delaying a transmission of the electronic file to the second person by the data transmission delay in order to determine whether the end user had a negative reaction;
   determining that the end user had the negative reaction based on the captured images; and
   transmitting the electronic file to the second person in response to determining that a confirmation of file transmission from the end user is required based upon the negative reaction.

2. The method of claim 1, further comprising:
   requesting a confirmation to perform the transmission in response to determining that the end user had the negative reaction, the transmitting the electronic file to the second person is performed in response to receiving the confirmation from the end user.

3. The method of claim 1, wherein:
   the electronic file comprises an email message and the detecting that an end user of a computing device intends to transmit an electronic file comprises determining that the end user has selected an option to send the email message.

4. The method of claim 1, wherein:
   the detecting that an end user of a computing device intends to transmit an electronic file to a second person comprises determining that a target email address associated with the second person is different from one or more email addresses associated with the end user.

5. The method of claim 1, wherein:
   the determining a data transmission delay comprises acquiring an individual mood classification associated with the end user and assigning the data transmission delay based on the individual mood classification.

6. The method of claim 1, wherein:
   the determining a data transmission delay comprises determining a time of day and assigning the data transmission delay based on the time of day.

7. The method of claim 1, wherein:
   the determining that the end user had the negative reaction based on the captured images comprises determining that the end user performed a particular facial expression based on the captured images.

8. The method of claim 1, wherein:
   the computing device comprises a mobile device; and
   the electronic file comprises an email message.

9. A system, comprising:
   a storage device, the storage device comprises a buffer; and
   a hardware processor in communication with the storage device, the hardware processor detects that an end user of the system intends to transmit an electronic file to an address associated with a second person, the hardware processor acquires images of the end user in response to detecting that the end user intends to transmit the electronic file, the hardware processor determines a data transmission delay, the hardware processor delays a transmission of the electronic file to the address associated with the second person by the data transmission delay in response to detecting that the end user intends to transmit the electronic file in order to determine whether the end user had a negative reaction, the hardware processor causes the electronic file to be stored in the buffer, the hardware processor determines that the end user had the negative reaction based on the images, the hardware processor causes the electronic file to be transmitted to the address associated with the second person in response to determining that a confirmation of file transmission from the end user is required based upon the negative reaction.

10. The system of claim 9, wherein:
    the hardware processor determines that the end user had the negative reaction by determining that the end user performed a particular facial expression based on the captured images.

11. The system of claim 9, wherein:

the hardware processor requests a confirmation to perform the transmission in response to determining that the end user had the negative reaction, the hardware processor causes the electronic file to be transmitted to the second person in response to receiving the confirmation from the end user.

12. The system of claim 9, wherein:

the data transmission delay is determined based on a time of day.

13. A computer program product having computer readable program code embodied in a non-transitory computer readable storage medium, the computer readable program code comprising:

computer readable program code configured to detect that an end user of a computing device intends to transmit an electronic file to an address associated with a second person;

computer readable program code configured to acquire images of the end user in response to detecting that the end user intends to transmit the electronic file;

computer readable program code configured to determine a data transmission delay;

computer readable program code configured to delay a transmission of the electronic file to the address associated with the second person by the data transmission delay so that a negative reaction of the end user can be determined in response to detecting that the end user intends to transmit the electronic file;

computer readable program code configured to determine whether the end user had the negative reaction based on the images; and computer readable program code configured to cause the transmission of the electronic file to the address associated with the second person in response to determining that a confirmation of file transmission from the end user is required based upon the negative reaction.

14. The computer program product of claim 13, further comprising:

computer readable program code configured to request a confirmation to perform the transmission in response to determining that the end user had the negative reaction and causing the transmission of the electronic file to the address associated with the second person in response to receiving the confirmation from the end user.

15. The computer program product of claim 13, wherein:

the detecting that the end user intends to transmit the electronic file to the second person comprises determining that a target email address associated with the second person is different from one or more email addresses associated with the end user.

16. The computer program product of claim 13, wherein:

the determining the data transmission delay comprises acquiring an individual mood classification associated with the end user and assigning the data transmission delay based on the individual mood classification.

17. The method of claim 1, wherein:

the determining that the end user had the negative reaction based on the captured images comprises determining that the end user is in a surprised emotional state based on the captured images.

18. The computer program product of claim 13, wherein:

the determining the data transmission delay comprises determining a time of day and assigning the data transmission delay based on the time of day.

19. The computer program product of claim 13, wherein:

the determining whether the end user had the negative reaction comprises determining that the end user performed a particular facial expression based on the images.

20. The computer program product of claim 13, wherein:

the computing device comprises a mobile device; and
the electronic file comprises an email message.

* * * * *